US012343314B2

(12) United States Patent
Morgan et al.

(10) Patent No.: US 12,343,314 B2
(45) Date of Patent: Jul. 1, 2025

(54) PACIFIER WITH COUPLING MECHANISM

(71) Applicant: Flow Creations, LLC, Temple, TX (US)

(72) Inventors: Grady Stewart Morgan, Temple, TX (US); Leslie Yarborough Morgan, Pettigrew, AR (US)

(73) Assignee: Flow Creations, LLC, Temple, TX (US)

( * ) Notice: Subject to any disclaimer, the term of this patent is extended or adjusted under 35 U.S.C. 154(b) by 0 days.

(21) Appl. No.: 18/959,941

(22) Filed: Nov. 26, 2024

(65) Prior Publication Data

US 2025/0170026 A1 May 29, 2025

Related U.S. Application Data

(60) Provisional application No. 63/603,243, filed on Nov. 28, 2023.

(51) Int. Cl.
*A61J 17/00* (2006.01)

(52) U.S. Cl.
CPC ............ *A61J 17/001* (2015.05); *A61J 17/10* (2020.05)

(58) Field of Classification Search
CPC ........ A61J 17/001; A61J 17/111; A61J 17/00; A61J 17/1111; A61J 17/1115; A61J 17/113; A61J 17/105; A61J 17/02
See application file for complete search history.

(56) References Cited

U.S. PATENT DOCUMENTS

2011/0266319 A1* 11/2011 Jaegar-Waldau ......... A45F 5/02 224/269

* cited by examiner

*Primary Examiner* — Majid Jamialahmadi
(74) *Attorney, Agent, or Firm* — H. Brock Kolls

(57) ABSTRACT

The present invention relates to a pacifier with integrated coupling mechanism designed to securely attach to various objects, providing ease of use for caregivers and comfort for infants. The pacifier features a shield with ventilation holes and, in one embodiment, a stretchable ring coupled to actuating arms and knobs that draw together in a closed position when not in use. In an alternate configuration, the coupling mechanism comprises first and second shield halves joined by an elastic region, with the knobs biased to close. The central nipple extends from the shield and includes a flexion region, shaft, and tip designed for comfort. The knobs incorporate contoured surfaces and recessed areas to improve grip on fabrics, while a nose recess along the shield edge reduces contact pressure around the infant's nose. This design enhances accessibility and reduces the risk of contamination, providing a convenient, secure, and comfortable pacifier for infants.

18 Claims, 12 Drawing Sheets

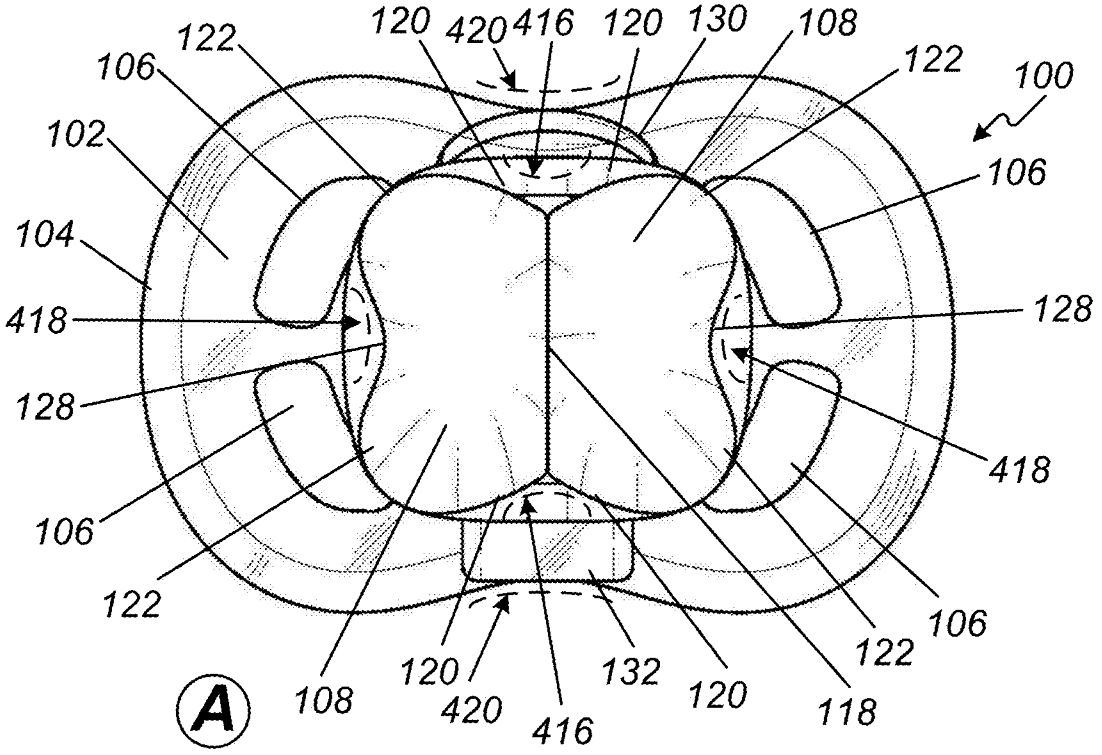
*Fig. 8*
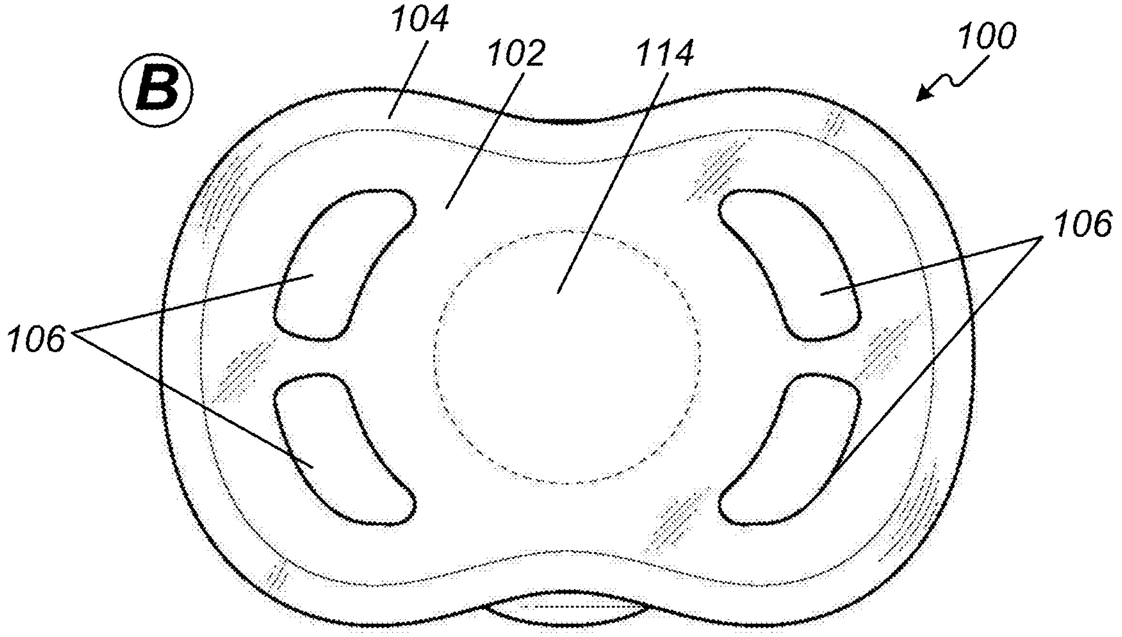

PACIFIER WITH COUPLING MECHANISM

CROSS-REFERENCE TO RELATED APPLICATIONS

This application contains subject matter which is related to the subject matter of the following application. The below-listed application is hereby incorporated herein by reference in its entirety:

This is a U.S. non-provisional application that claims the benefit of a U.S. provisional application, Ser. No. 63/603,243, inventor Grady Stewart Morgan, entitled “PACIFIER WITH COUPLING MECHANISM”, filed Nov. 28, 2023.

TECHNICAL FIELD OF THE INVENTION

The present invention relates to infant care devices, and more specifically, to pacifiers equipped with an integrated coupling mechanism designed to securely attach to objects such as fabric or clothing. This invention provides multiple embodiments of the coupling mechanism, including configurations utilizing a stretchable ring or an elastic region, to create a natural bias for closing the pacifier's attachment features. In one embodiment, the stretchable ring operates in conjunction with a single-piece shield that flexes along its median. In another embodiment, the elastic region joins two shield halves, forming a flexible connection that enhances structural integrity and functionality. These configurations are designed to ensure secure attachment, ease of use, and enhanced comfort for both infants and caregivers, addressing longstanding challenges in pacifier design while promoting convenience and accessibility.

BACKGROUND OF THE INVENTION

Before our invention, conventional pacifiers are prone to falling out of a baby's mouth, frequently becoming contaminated and inaccessible. When this happens, caregivers are required to retrieve, clean, and return the pacifier, which consumes time and effort. If cleaning supplies are not immediately available, caregivers may forego sanitizing the pacifier, posing potential health risks to the baby. The constant need to monitor and re-sanitize pacifiers limits their effectiveness as a convenient source of comfort for infants.

Pacifiers can become inaccessible in a variety of everyday situations. For example, while cradling a baby, a pacifier may fall, requiring the caregiver to juggle retrieving and cleaning it, often while holding the baby. This can be especially difficult in low-light settings, such as at night. To avoid drops, some caregivers may hold the pacifier in the baby's mouth, which reduces the baby's autonomy and may increase the risk of choking. Similarly, when the baby is sitting, lying, or crawling, a pacifier can easily fall out of reach. Babies, particularly those with developing motor skills, may not have the dexterity needed to retrieve and reorient the pacifier independently. In situations where the caregiver is not immediately available, such as when the baby is secured in a car seat while the caregiver is driving, the baby may become distressed due to the inability to reach the pacifier.

Various solutions exist to address the problems of accessibility and cleanliness, such as attachable pacifier clips that connect to the baby's clothing. However, these clips come with several limitations. They are often cumbersome to attach and detach, making it difficult for caregivers to clean both the pacifier and clip effectively. When attached, the pacifier dangles freely, which can make it harder for babies with limited motor control to reach and reinsert the pacifier. Dangling pacifiers can also become tangled or snagged on other objects, potentially posing a safety risk. Furthermore, clips commonly contain small metal or plastic components, which may press against the baby or caregiver, causing discomfort, or could present a choking hazard if damaged.

Other approaches attempt to keep pacifiers clean by covering the nipple or offering sanitization options, such as UV sterilization devices. While these options provide some degree of protection, they do not address accessibility issues, as caregivers must still retrieve the pacifier when it falls. Even when the nipple is covered, other parts of the pacifier may still come into contact with contaminated surfaces, posing a risk since babies frequently place the entire pacifier in their mouths. Additionally, UV sterilization, while effective, can degrade materials like silicone and rubber, which are commonly used for pacifier nipples, potentially reducing the durability and safety of the pacifier over time.

The present invention overcomes these limitations by providing a pacifier with an integrated coupling mechanism that securely attaches to objects without requiring additional accessories. This design keeps the pacifier accessible to the baby, minimizes contamination risk, and removes the need for external clips or cumbersome sanitization solutions, thereby fulfilling a long-standing need for a more practical, hygienic, and user-friendly pacifier.

SUMMARY OF THE INVENTION

The shortcomings of the prior art are overcome, and additional advantages are provided through the provision of a pacifier with an integrated coupling mechanism. The pacifier comprises a shield with a front face, back face, shield opening, and ventilation holes, wherein the shield is designed to flex along its median. A nipple extends outwardly from the front face, while actuating arms extend from the back face and are attached to a pair of knobs. The knobs are configured to open and close based on the movement of the actuating arms and the shield. A stretchable ring is coupled to the actuating arms, forming a coupling mechanism that applies a contracting force to draw the knobs together when no external force is applied. This mechanism securely attaches the pacifier to objects such as fabric or clothing, offering a practical, secure, and user-friendly solution for caregivers.

Additional shortcomings of the prior art are overcome and additional advantages are provided through the provision of a pacifier with an integrated coupling mechanism. The pacifier includes a shield with a front face, back face, shield opening, and ventilation holes, designed to flex along its median. A first overcoat layer forms an elastic region along portions of the shield configured to flex, introducing a biasing tension and creating a compressive edge. A nipple extends outwardly from the front face, while actuating arms extend from the back face and are attached to a pair of knobs. The elastic region and actuating arms collectively form a coupling mechanism, with the biasing tension in the elastic region drawing the knobs into a closed position. Applying force to pressing surfaces on the shield causes the shield to flex at the elastic region, separating the actuating arms and opening the knobs. Releasing the pressing surfaces allows the elastic region to contract, returning the knobs to a closed position, securely attaching the pacifier to an object. This design ensures reliable operation, secure attachment, and ease of use for caregivers.

Additional shortcomings of the prior art are overcome and additional advantages are provided through the provision of a method of attaching a pacifier with an integrated coupling mechanism to an object. The method involves a pacifier comprising a shield, a pair of actuating arms, and a pair of knobs biased in a closed position. The method includes applying pressure to pressing surfaces located on the back face of the shield, causing the shield to flex along its median and separate the actuating arms, thereby opening the knobs. The opened knobs are positioned around a portion of the object to be secured. Releasing the pressure on the pressing surfaces allows the shield to return to its resting state, with the knobs closing under biasing tension to securely attach the pacifier to the object. This method provides a simple, reliable, and user-friendly way for caregivers to secure the pacifier to various objects.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 8 illustrates one example of a bottom or back face view and a top or front face view of the pacifier with a coupling mechanism;

Figure 1:
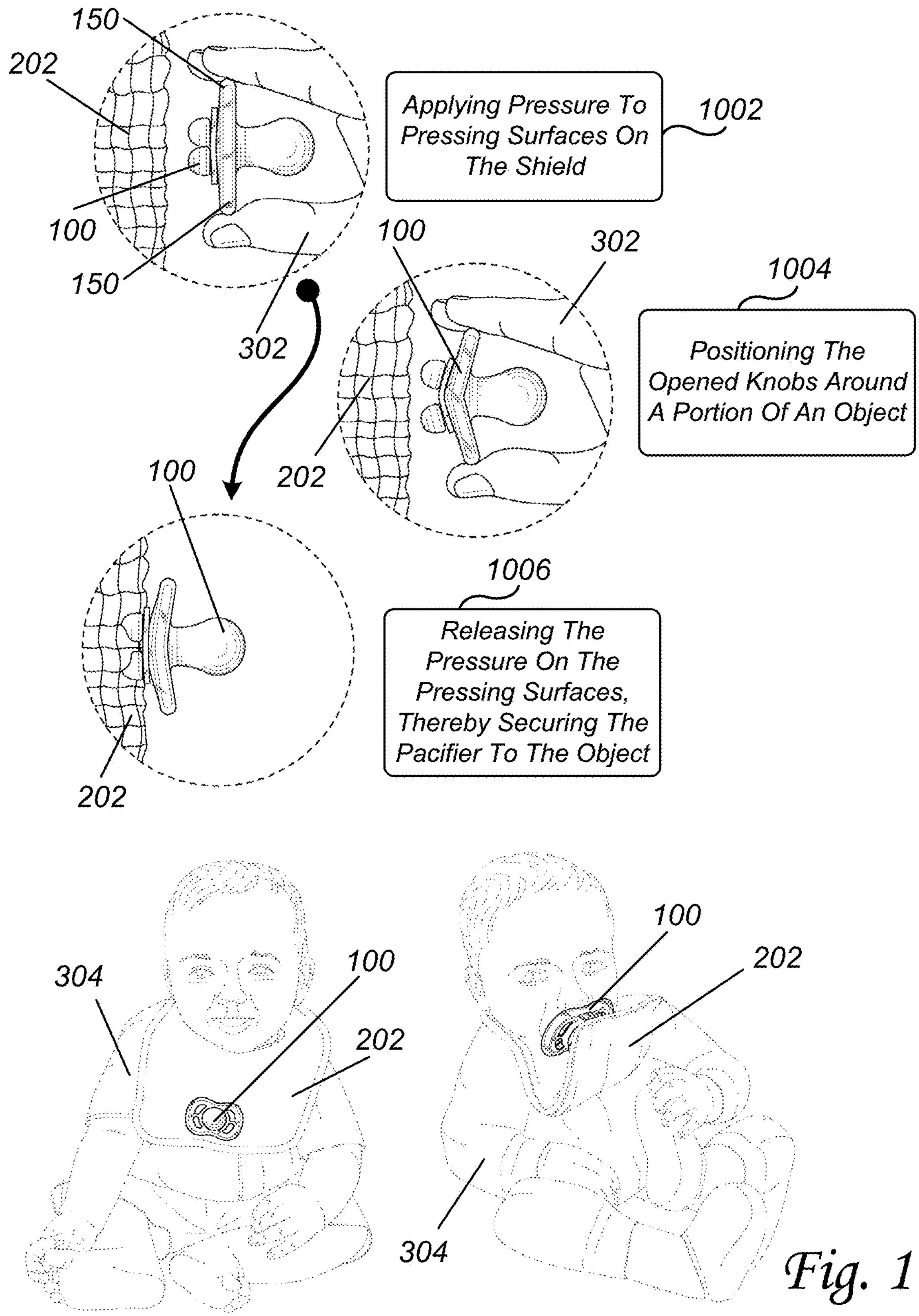
FIG. 1 illustrates one example of using the pacifier with a coupling mechanism.

The detailed description explains the preferred embodiments of the invention, together with advantages and features, by way of example with reference to the drawings.

DETAILED DESCRIPTION OF THE INVENTION

The present invention provides a pacifier with an integrated coupling mechanism designed to address key needs for both caregivers and babies. This pacifier can be secured to various locations deemed convenient by the caregiver, ensuring the pacifier remains readily accessible and minimizing the risk of contamination. The invention enables babies, even those with underdeveloped fine motor skills, to access the pacifier independently, thus fostering autonomy at an early age. Additionally, the present invention allows for rapid and easy attachment and detachment, making it practical for caregivers who frequently need to stow or retrieve the pacifier. This functionality is achieved without the need for additional equipment or external fasteners, reducing the complexity and discomfort often associated with conventional pacifier clips or attachments.

In the present invention, the term "integrated" is intended to mean that the coupling mechanism is inherently part of the pacifier's design and construction, functioning as a cohesive unit with the pacifier's other components. This integration may be achieved through various means, including but not limited to:

- Single-piece Formation: The coupling mechanism and pacifier may be formed as a single, continuous structure, such as through molding or casting, where the components are inseparable.
- Permanent Affixation: The coupling mechanism may be separately manufactured but permanently affixed to the pacifier during assembly, ensuring it cannot be removed or detached without damaging the pacifier.
- Structural Combination: The coupling mechanism may be designed to work in unison with other components of the pacifier, such as the shield, knobs, and actuating arms, to perform its intended function without requiring external attachments or modifications.

The term "integrated" emphasizes that the coupling mechanism is not an auxiliary or add-on feature but rather a core, unified part of the pacifier's design, providing seamless functionality. For example, in one embodiment, the stretchable ring may operate as part of the integrated coupling mechanism, while in another embodiment, the elastic region formed by a first overcoat layer serves the same purpose. In all cases, the coupling mechanism is incorporated in a manner that ensures it is readily usable without requiring additional components or assembly by the caregiver.

The present invention comprises a pacifier with an integrated coupling mechanism that may, in various embodiments, include a flexible shield with a front face and a back face, a nipple extending from the front face, a set of actuating arms, and a pair of knobs attached to the actuating arms extending from the back face. These knobs may be configured to open and close 426 relative to each other based on the movement of the actuating arms, allowing the pacifier to grip or release an object securely. In one embodiment, the pacifier includes a single shield with a stretchable ring in a resting state that applies a contracting force on the actuating arms, thereby drawing the knobs together when no external force is applied. Alternatively, the invention may include a two-part shield comprising a first and second half shield, joined at their edges by an elastic region formed by a first overcoat layer, which biases the knobs into a closed position when in a resting state.

In a plurality of exemplary embodiments, the pacifier 100 with an integrated coupling mechanism may include either a single-piece shield 102 or a combination of a first half shield 102A and a second half shield 102B, depending on the embodiment. These shield configurations can be interchangeably used with either a stretchable ring 112 or an elastic region 116, providing flexibility in design and functionality.

For example, in some embodiments, the stretchable ring 112 may be operationally connected to the knobs 108 and actuating arms 110 in either a single-piece shield 102 or a two-piece shield comprising first and second shield halves (102A and 102B). The stretchable ring 112 applies a contracting force, drawing the knobs 108 into a closed position to maintain secure attachment.

Alternatively, in other embodiments, the elastic region 116 may be integrated into the design, serving as a flexible joint that connects the first and second shield halves 102A and 102B or is part of a single-piece shield 102. The elastic region 116 allows the shield 102 to flex when external pressure is applied to the pressing surfaces 150 and provides a biasing tension that returns the knobs 108 to a closed position upon release.

These interchangeable configurations ensure that pacifier 100 meets the needs of both caregivers and infants by offering options for secure attachment, ease of operation, and manufacturing adaptability while maintaining the core functionality and benefits of the coupling mechanism.

To further enhance its functionality and comfort, the present invention may incorporate additional design elements, including but not limited to:

- Channel Recesses—The shield may be configured with channel recesses positioned centrally and proximate to the shield opening, allowing the shield to flex precisely at these points, which can facilitate smooth operation of the coupling mechanism when force is applied.
- Textured Knobs—In some embodiments, the knobs may have a textured surface to improve their grip on objects, enhancing the pacifier's ability to remain secured without slipping, even on smooth fabrics or materials.
- Ventilation and Overcoat Layers—The shield may include a set of ventilation holes strategically distributed around the shield opening, promoting airflow to reduce moisture accumulation and improve comfort. The shield may also be covered by an overcoat layer, which can enhance durability, provide a soft exterior surface, and allow for easy cleaning.
- Concave Shield Design—For improved ergonomics and ease of use, the shield may have a concave structure toward the nipple side, assisting the user in opening the knobs by applying pressure to the designated pressing surfaces.
- Spring or Elastic Mechanism—The integrated coupling mechanism may further include a biasing mechanism, such as a stretchable ring or elastic region, which is configured to draw the knobs together when pressure is released from the shield. This feature allows the pacifier to securely grip an object without requiring an external attachment, providing both safety and convenience.
- Multi—Layer Shield Structure—In embodiments utilizing single piece shields or two half shields, the shields may be initially angled relative to a horizontal reference surface 408 where a first overcoat is applied to create an elastic region and then flexed to a horizontal position with respect to the horizontal reference surface 408 or greater to stretch the elastic region and create a compressive edge along one side, adding structural integrity. A second overcoat layer may be applied to further enhance stability and maintain the desired shape during use.
- Soothing Element—The shield may include a soothing element or soothing appendage that protrudes from one side of the shield. This element can take the form of a nipple, promoting non-nutritive sucking to soothe the baby, or a teether, providing sensory stimulation and a chewable surface to alleviate discomfort associated with teething.
- Pull Tabs—The stretchable ring may include integrated pull tabs of varying sizes to aid caregivers in installing, adjusting, or removing the ring from the knobs and actuating arms, ensuring ease of use and efficient cleaning.
- Stretchable Ring Joining Material—The stretchable ring may be joined to other pacifier structures such as the nipple base or shield by a joining material or hinge that allows the ring to be coupled on and off the actuating arms while not detaching completely from the other structures.
- Actuating Arm Reinforcement—The shield may include perimeter walls or wall sections protruding from the back face of the shield proximate to the shield opening. The walls provide structural support to the actuating arms, enhancing their stability and the effectiveness of the coupling mechanism.
- Contoured Grip Design—The knobs may incorporate contoured gripping surfaces, such as recessed or ridged areas, to provide an enhanced grip on fabrics or other materials. This design allows the pacifier to secure firmly in place, even on thick or smooth surfaces.

The present invention also provides significant advantages over existing pacifier designs. The integrated coupling mechanism eliminates the need for external clips or fasteners, allowing the pacifier to be securely attached to common items such as clothing, bibs, plush toys, or other accessible objects. This feature not only enhances accessibility for the baby but also provides caregivers with a quick and reliable means to store the pacifier on convenient surfaces, such as strollers, car seats, and backpacks, when not in use.

Additionally, the pacifier remains in an ideal orientation once attached, reducing the need for babies to manipulate it, thereby minimizing fine motor requirements and enabling younger babies to interact with the pacifier autonomously. The unique design of the coupling mechanism allows for effortless detachment, so caregivers can remove the pacifier quickly without the need for complex maneuvers or additional tools.

Structurally, the invention is distinguished by the presence of several unique features, including:

- Divided Knob Mechanism—The knob of the pacifier may be split into two halves, which separate upon application of pressure to specific areas on the shield.
- Shield Flexibility and Biasing—When pressure is applied to designated pressing surfaces on the shield, the shield flexes, separating the knobs. The biasing mechanism, such as a stretchable ring or elastic region, draws the knobs back together upon release, allowing the pacifier to securely grip objects.
- Ergonomic and Safe Design—The material and shape of the knobs, shield, and nipple, along with the concave shield shape, ventilation holes, and optional textured surfaces on the knobs, contribute to the comfort, safety, and sensory appeal of the pacifier. While the textured knobs provide an improved grip on objects, the knob, shield, and nipple are designed with materials that are gentle against the baby's skin and suitable for extended and independent (or unsupervised) use by babies. These features ensure the pacifier remains secure and comfortable for infants while supporting sensory engagement.

In operation, the present invention addresses the practical needs of caregivers and babies by providing a pacifier that remains accessible, promotes independent use, and can be securely attached and detached without external apparatus. The following description and accompanying drawings provide specific examples of embodiments of the invention, though it should be understood that the invention may be embodied in various forms and is not limited to the described embodiments. The embodiments and figures provided herein are intended to illustrate the principles and functional features of the invention, and variations in form and implementation are within the scope of the invention as defined by the claims.

In some embodiments, components designed for use in infant products may utilize a combination of materials chosen for their flexibility, durability, and safety compliance. These materials are selected to provide a balance of rigidity in structural elements and elasticity in areas requiring flexibility. Suitable materials often include food-grade and medical-grade polymers such as silicone, thermoplastic elastomers (TPE), and thermoplastic polyurethane (TPU). These polymers are safe for oral contact and adhere to rigorous child safety standards, ensuring that components withstand repeated handling without degradation, maintaining comfort and resilience over extended use.

Specialized coatings using a flexible material may be applied to enhance both structural integrity and functionality. In one approach, a first coating layer is applied to form an elastic region over a more rigid structural component configured to flex along the median. This initial layer is often applied while the component is positioned at a specific angle, creating a compressive edge when the components are flattened, thereby adding structural stability to the assembly. A second coating layer may be subsequently applied to maintain the flattened configuration, providing additional support. The combination of these coatings enhances flexibility by allowing the component to bend and then return to its original state as needed. Together, the first and second coatings provide added durability to the device, helping it withstand daily wear while preserving its functional properties.

The assembly process may involve techniques such as two-shot molding, over-molding, ultrasonic welding, and mechanical fastening to securely bond various materials and form integrated structural regions. Through over-molding, materials are layered to create elasticity, grip, and structural support without the need for fasteners or adhesives. For example, during over-molding, the first coating layer is applied seamlessly to structural halves, holding the halves together and creating an elastic region that provides the necessary biasing force for operational functions. This multi-layered approach to assembly ensures robust and reliable performance, while the selected materials and coating processes contribute to a high degree of durability, essential for products intended for infants and young children.

Turning now to the drawings in greater detail, it will be seen that in FIG. 1 there is illustrated one example of using the pacifier 100 with an integrated coupling mechanism. In an exemplary embodiment, a caregiver 302 is shown securing the pacifier 100 onto an object 202, such as a bib, which is worn by a baby 304. This positioning allows the pacifier 100 to remain accessible while reducing exposure to contamination by keeping it off unclean surfaces. Additionally, this attachment design provides the caregiver 302 with a convenient method for placing and removing the pacifier 100 as needed, making it both practical and efficient for use throughout daily activities.

In this embodiment, the pacifier 100 includes a flexible shield 102 with designated pressing surfaces 150 on opposite sides. The shield 102 is configured with channel recesses 164 that enable controlled flexing, which is key to operating the integrated coupling mechanism. The pacifier's coupling mechanism includes actuating arms 110 connected to a pair of knobs 108, which are configured to open and close 426 relative to each other. The coupling mechanism also includes a biasing component, which may be a stretchable ring 112 or an elastic region 116 formed from an overcoat layer, that is designed to draw the knobs 108 together in a resting state.

In the present invention, the term "compressive edge 148" is intended to mean the structural boundary created when versions involving an elastic region are flexed and flattened during manufacturing. This edge provides reinforcement along the perimeter of the shield's front face, contributing to the overall structural stability of the pacifier. It helps maintain the shield's shape and supports the biasing mechanism that keeps the knobs in a closed position, enhancing attachment reliability.

In the present invention, the term "elastic region 116" is intended to mean the flexible overcoat layer surrounding the median axis of the shield where the shield angle is adjustable. This elastic region enables controlled movement of the shield, allowing it to flex when external force is applied to the pressing surfaces. The elastic region creates a natural closing bias that draws the knobs together when the external force is released, allowing the coupling mechanism to securely attach the pacifier to an object.

In the present invention, the term "biasing tension" is intended to mean the force generated by either the stretchable ring 112 or the elastic region 116 that pulls the knobs into a closed position when no external force is applied. This tension is essential for the pacifier's function, as it allows the coupling mechanism to maintain a secure grip on attached objects without needing additional fasteners, ensuring the pacifier remains accessible and reliable.

In a first step 1002, caregiver 302 applies pressure to the pressing surfaces 150 on the shield 102. As pressure is applied, shield 102 flexes at channel the recesses 164 or the shield gap 146, which are positioned centrally and proximate to the perimeter of shield opening 140. This flexing action causes the actuating arms 110 to move apart, creating a separation between the knobs 108 attached to the actuating arms. By separating the knobs 108, the pacifier 100 transitions from a closed, biased position to an open position, allowing it to be placed around an object.

In the context of the pacifier 100 with an integrated coupling mechanism, the knobs 108 are configured to transition between "open" and "closed" 426 positions to facilitate attachment to and removal from an object, such as a bib or other accessible item.

- Closed Position: In the closed position, the knobs 108 are drawn together by the biasing mechanism, such as a stretchable ring 112 or elastic region 116, which exerts a contracting force on the actuating arms 110. This closed position enables the knobs 108 to grip or secure an object placed between them. The closed position is generally the default or resting state of the knobs 108 when no external force is applied to the pressing surfaces 150, allowing the pacifier 100 to remain securely attached to the object.
- Open Position: In the open position, the knobs 108 are spaced apart due to the flexing of the shield 102 at the channel recesses 164 or shield gaps 146, which occurs when pressure is applied to the pressing surfaces 150. This flexing action causes the actuating arms 110 to move away from each other, thereby separating the knobs 108. The open position allows the knobs 108 to fit around or be removed from an object, providing a clear opening for the caregiver 302 to position the pacifier 100 as desired.

In a second step 1004, with the knobs 108 in the open position, the caregiver 302 positions the pacifier 100 around a portion of the object 202, shown in this embodiment as a bib worn by the baby 304. The caregiver 302 aligns the open knobs 108 so that they fit around an edge or portion of the bib, enabling the pacifier 100 to grip the object 202 once the knobs are returned to their closed position. This open position provides ample space between the knobs 108, allowing the caregiver 302 to place the pacifier 100 on a variety of objects such as fabric surfaces, straps, or other convenient object that are accessible to the baby 304 or caregiver 302.

In a third step 1006, caregiver 302 releases the pressing surfaces 150, allowing the shield 102 and actuating arms 110 to return to their resting state. In this state, the biasing component-whether a stretchable ring 112 or an elastic region 116 formed by an overcoat layer-contracts, bringing the actuating arms 110 and the attached knobs 108 back together. This action applies a gentle but secure grip on object 202, effectively securing the pacifier 100 in place without requiring additional external equipment such as clips or fasteners. The integrated coupling mechanism enables pacifier 100 to remain attached to object 202, maintaining accessibility for baby 304 and facilitating the caregiver's ability to attach and remove it as needed.

This secure attachment method offers several practical advantages. By allowing the pacifier 100 to be positioned on items like bibs, clothing, or plush toys, caregiver 302 can keep the pacifier 100 within reach while reducing the likelihood of the pacifier falling to the ground and becoming dirty. Cleanliness is further supported by the nipple (or soothing element) angling away from the object 202 eliminating contact between the nipple and any surface. Additionally, the mechanism's ease of use permits quick attachment and removal, which is convenient in settings where the caregiver needs to keep the pacifier available but may need to stow it quickly, such as during feeding or transport. Moreover, the pacifier 100's ability to be attached without external apparatus enhances its simplicity, as it is entirely self-contained and does not require additional parts that could cause discomfort to the baby 304 or the caregiver 302. This also makes cleaning easier, as there are less parts that need to be cleaned. Furthermore, by bringing the pacifier 100 into an open position, the interior surfaces of the knob and nipple can be easily accessed, which further simplifies the cleaning process.

The design of the coupling mechanism also supports stability by maintaining the pacifier 100 in a desired orientation on object 202, reducing the need for fine motor control by the baby 304. For example, as better illustrated in at least FIG. 1, the orientation of the pacifier 100 on the bib 202 enables the baby 304 to bring the pacifier 100 to their mouth by lifting the bib 202, a movement that only requires gross motor control. Because gross motor control develops before fine motor control, this stable positioning can be particularly beneficial for younger babies as it facilitates independent access to the pacifier 100 and supports developmental autonomy.

Additionally, another notable benefit of the pacifier's integrated coupling mechanism is the ability to securely attach the pacifier to the breast area of a caregiver's shirt. This placement offers several advantages, particularly when the caregiver is cradling the baby. By positioning the pacifier in this location, it remains readily accessible to the baby while preventing it from falling to the ground if the baby stops using it. This secure attachment frees the caregiver's hands, allowing them to focus on holding the baby or performing other tasks, and is especially beneficial in low-light or nighttime settings when retrieving a dropped pacifier would be difficult and disruptive.

In addition to its practical benefits, this placement offers unique opportunities for fostering emotional and sensory connections between the baby and caregiver. By aligning the pacifier with the caregiver's body and natural movements, the pacifier creates an experience for the baby that closely resembles breastfeeding, promoting a greater sense of connection and security. The caregiver, in turn, receives sensory feedback from the baby's movements through the chest area, enabling precise orientation of the pacifier and deepening the caregiver's awareness of the child's needs.

This sensory alignment is particularly valuable for families who are unable to breastfeed for various reasons. By replicating key aspects of the breastfeeding experience-such as proximity, body alignment, and mutual feedback—the pacifier enhances bonding and facilitates a secure psychological attachment in the parent-child relationship. This feature highlights the inventor's vision of supporting emotional and physical connection between the caregiver and baby while addressing practical challenges associated with traditional pacifiers.

Overall, FIG. 1 illustrates a practical, user-friendly method for securing the pacifier 100 with a coupling mechanism to various objects. This integrated approach not only maintains the cleanliness and accessibility of the pacifier 100 but also enhances the caregiver's ability to manage it efficiently. The pacifier's design is versatile, allowing it to adapt to different attachment surfaces while providing comfort and ease of use for both the baby 304 and the caregiver 302.

In an exemplary embodiment, the shield 102 of the pacifier 100 may flex specifically at channel recesses 164 when pressure 412 is applied to the pressing surfaces 150. These channel recesses 164 are positioned centrally and proximate to the perimeter of the shield opening 140, allowing shield 102 to bend in a controlled manner. This flexing action facilitates the movement of the actuating arms 110, enabling the knobs 108 to separate and create an open position around the object 202. The biasing component whether a stretchable ring 112 or an elastic region 116 formed by the overcoat layer and an associated manufacturing strategy-creates a biasing tension, bringing the actuating arms 110 and the attached knobs 108 back together into a closed position around the object 202. The precise positioning of the channel recesses 164 aids in the efficient and predictable operation of the coupling mechanism 108/110/112 by guiding the shield's flexion at desired points, optimizing the user experience for the caregiver 302.

In another exemplary embodiment, the shield has first and second shield halves, 102A and 102B, where the shield halves are positioned proximate to each other and separated by shield gaps 146. These shield gaps 146 are positioned centrally and proximate to the perimeter of the shield opening 140. The two shield halves are held together by an overcoat layer creating a secure and stable connection between the two halves. The shield gaps 146 in combination with the overcoat layer allow the shield halves, 102A and 102B, to bend in a controlled manner. This flexing action facilitates the movement of the actuating arms 110, enabling the knobs 108 to separate and create an open position around the object 202. The biasing component-whether a stretchable ring 112 or an elastic region 116 formed by the overcoat layer and an associated manufacturing strategy-creates a biasing tension, bringing the actuating arms 110 and the attached knobs 108 back together into a closed position around the object 202. The precise positioning of the shield gaps 146 aids in the efficient and predictable operation of the coupling mechanism 108/110/112 by guiding the shield's flexion at desired points, optimizing the user experience for the caregiver 302.

In some embodiments, the shield 102 may include an elastic region 116 formed by an overcoat layer, which, in a resting state, creates a biasing tension 410 that pulls the knobs 108 toward a closed position when no external force 412 is applied to the pressing surfaces 150. This elastic region 116 may be located along or around the channel recesses 164, where the overcoat layer applies a continuous biasing tension 410 that draws the actuating arms 110 together. When pressure on the pressing surfaces 150 is released, the elastic region 116 naturally returns to a more contracted state, drawing the knobs 108 into a closed position around the object 202. This feature allows pacifier 100 to maintain a secure hold on the object without any external clips or fasteners.

In an exemplary embodiment, the shield 102 may be concave 422 toward the nipple 114 side, which assists in separating the knobs 108 when the pressing surfaces 150 are engaged by the caregiver 302. This concave shape 422 provides additional ergonomic benefits, making it easier for caregiver 302 to apply pressure 150/412 in a manner that effectively operates the coupling mechanism 108/110/112. The concavity of the shield 102 reduces the effort required to separate the knobs 108, enhancing usability, particularly in scenarios where rapid attachment or removal of the pacifier 100 is desired.

In another exemplary embodiment, shield 102 may include a plurality of ventilation holes 106 distributed around the shield opening 140. These ventilation holes 106 facilitate airflow, helping reduce moisture buildup during use and ensuring that the pacifier 100 remains comfortable and safe for baby 304. The ventilation holes 106 may be strategically positioned to maximize airflow while maintaining the structural integrity of the shield 102. This feature contributes to the overall durability of pacifier 100 and enhances hygiene by reducing the accumulation of moisture on surfaces that come into contact with baby 304.

In further embodiments, shield 102 may be formed with a single overcoat layer that serves to bond the first and second shield halves, 102A and 102B, while also enhancing structural integrity and creating the elastic region 116. During assembly, the shield halves are initially positioned at an angle 406 relative to each other and a horizontal reference 408 surface. This angled configuration results in the formation of a compressive edge 148 when the shield halves are flattened after the application of the single overcoat layer. The overcoat layer is applied in a manner that ensures coverage of the joint between the shield halves.

In this embodiment, the single overcoat layer provides sufficient durability and stability by reinforcing the bond between the shield halves and creating a smooth, continuous exterior surface. The elastic region 116 formed by this process applies biasing tension 416 to the knobs 108 via the actuating arms 110, ensuring that the knobs 108 are drawn together in the resting, or closed position. The compressive edge 148 further supports the structural stability of the shield 102, helping to maintain its shape during operation while also contributing to the biasing tension 416 needed to hold the knobs 108 in a closed position. This single-layer construction enables shield 102 to achieve both flexibility and durability while simplifying the manufacturing process. The biasing force provided by the elastic region 116 secures the pacifier 100 to an object 202 when the pressing surfaces 150 are not engaged, ensuring reliable operation without the need for additional structural layers.

Figure 2:
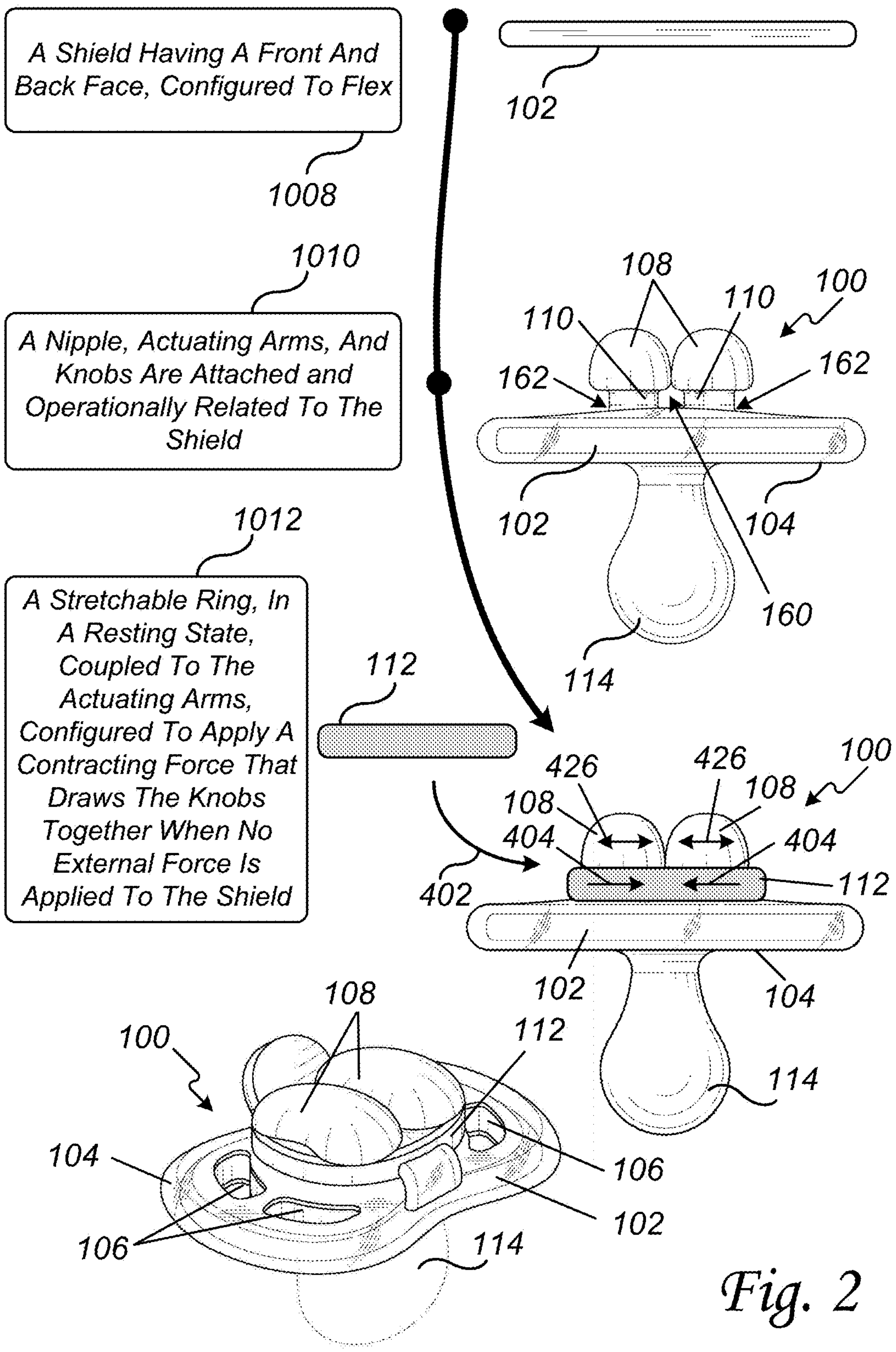
FIGS. 2-3 illustrates one example of manufacturing the pacifier with a coupling mechanism.

Referring to FIG. 2, there is illustrated one example of manufacturing the pacifier 100 with an integrated coupling mechanism. In an exemplary embodiment, this pacifier 100 is designed to meet the needs of both caregivers and babies by offering a secure, self-contained attachment mechanism. The manufacturing process involves multiple steps, including forming the shield 102 and its related features, assembling components such as the nipple 114, actuating arms 110, and knobs 108, and incorporating a stretchable ring 112 as a biasing mechanism. Each of these components is engineered to work together seamlessly, providing a practical and reliable way to attach the pacifier 100 to various items without requiring any external fasteners or clips.

In an initial step 1008, shield 102 can be formed with several specialized structural features. These features support the pacifier's operation and contribute to its durability, comfort, and ease of use. The shield 102 has a front face and a back face, with a centrally located shield opening 140 designed to accommodate the nipple 114 and actuating arms 110. To facilitate the coupling mechanism, shield 102 includes channel recesses 164 positioned centrally and close to the perimeter of the shield opening 140. These channel recesses 164 allow the shield 102 to flex in a controlled manner when pressure is applied to designated pressing surfaces 150 on the back face. This controlled flexing is fundamental to the pacifier's functionality, enabling the actuating arms 110 to move apart and the knobs 108 to separate, transitioning the pacifier 100 into an open position for attachment or removal from an object.

In certain embodiments, the shield 102 may include an overcoat layer 104 applied to enhance durability and provide a soft, comfortable surface, making the pacifier as comfortable and hygienic as possible for baby 304. This overcoat layer 104 not only reinforces the shield's structure but also maintains flexibility in regions subject to repeated flexing during the operation of the coupling mechanism 108/110/112. Furthermore, the shield 102 may incorporate a set of ventilation holes 106 distributed around the shield opening 140, allowing for airflow and reducing moisture buildup, which can enhance comfort and safety for extended use. The ventilation holes 106 contribute to a drier and more breathable pacifier surface, reducing the risk of irritation around the baby's mouth—a feature particularly valued by caregivers.

Shield 102 is also designed with a concave shape toward the nipple 114 side. This concavity serves an ergonomic purpose, aiding the caregiver 302 in engaging the pressing surfaces 150 with minimal effort. This design allows the caregiver to apply pressure effectively, causing the shield 102 to flex at the channel recesses 164 and enabling smooth operation of the coupling mechanism. The shield's concave 422 structure creates a pacifier that is not only functional but also easy and intuitive to use, enhancing both comfort and convenience for caregivers.

In the next assembly step 1010, essential components including the nipple 114, actuating arms 110, and knobs 108 are added to the shield 102. The nipple 114 extends outwardly from the front face of the shield 102, protruding from the shield opening 140. Positioned in this way, the nipple 114 offers a soothing element for the baby 304 and remains accessible, thanks to the pacifier's secure and stable attachment to objects like clothing or bibs. This stable attachment helps ensure that nipple 114 and shield 102 stay in a predictable orientation, allowing baby 304 to interact with the pacifier independently and promoting early autonomy, which is a key benefit envisioned by the inventor.

On the back face of the shield 102, a set of actuating arms 110 extends from the opposite side of the shield opening 140. These actuating arms 110 are configured to move relative to each other as the shield 102 flexes, enabling the knobs 108 attached to the ends of the actuating arms 110 to transition between open and closed positions. To facilitate this movement, the knob cavity 160 separates the actuating arms 110, allowing them to move apart from each other when the shield 102 is flexed.

In some embodiments, the shield opening 140 is bordered by a wall section 142 that perimeters the opening and provides added structural integrity. This wall section 142 may be integrally formed as part of the shield 102, or, in alternate embodiments, as part of shield halves 102A and 102B in a two-part shield design. The wall section 142 serves to reinforce the actuating arms 110 so that their position relative to shield 102 is maintained in response to the force generated by the coupling mechanism. This ensures a secure and stable connection when attached to an object 202. In an exemplary embodiment, this provides stability when the coupling mechanism is in a closed position and the energy is pressing outwards. In embodiments that have a stretchable ring 112, the wall section 142 provides stability to the knob 108 in response to the tension generated by the stretchable ring 112, whether the coupling mechanism is in an open or a closed position.

Attached to the actuating arms 110 are a pair of knobs 108, which are configured to open and close based on the movement of the actuating arms. In the closed position, the knobs 108 draw together to grip an object, such as a bib 202, providing a secure attachment. Positioned between the bottom surface of the knobs 108 and the surface of the shield 102 is a knob cavity 160. This knob cavity 160 forms a gap that allows fabric or other material from object 202 to be captured when knobs 108 is in the closed position. When the pacifier 100 is attached to a bib 202 or similar object 202, this knob cavity 160 allows the fabric to settle within the gap, increasing the grip strength and securing force applied by the knobs 108. The inventor's vision for a reliable and stable attachment is realized in part through this feature, as it ensures pacifier 100 remains securely fastened even with movement.

The knobs 108 may also feature a textured surface to enhance their grip, especially when securing the pacifier 100 to fabric-based items like clothing or bibs. This texture, combined with the knob cavity 160, ensures that the pacifier 100 remains in place, minimizing the need for frequent adjustments by caregiver 302. The textured knobs 108, supported by the pivoted movement of the actuating arms 110 and the opening provided by the knob cavity 160, collectively provide a smooth, reliable mechanism for attaching and detaching the pacifier 100, adding to the device's ease of use and convenience.

In the final step, the stretchable ring 112 is added to the assembly by stretching the material and securing it around the actuating arms 110, which completes the coupling mechanism. In exemplary embodiments, the nipple 114, actuating arms 110, knobs 108, and stretchable ring 112 are added to the shield 102 as a single over-mold, where the stretchable ring 112 is joined to the other structures by a hinge 132, thereby creating a cohesive construction ensuring the stretchable ring 112 cannot become completely separated from the pacifier 100. Once assembled the stretchable ring 112 serves as a biasing component, exerting a constricting force 404 on the actuating arms 110. This force pulls the actuating arms 110 inward, drawing the knobs 108 together into a closed position, allowing the pacifier 100 to grip an object without external clips. The stretchable ring 112 ensures that, in a resting state, the knobs 108 remain closed, holding the pacifier 100 securely on the attached object. This biasing force not only secures the pacifier in place but also simplifies the process of attaching and detaching it, embodying the inventor's vision of a pacifier that is both reliable and easy to use.

When the caregiver 302 applies pressure to the pressing surfaces 150, the shield 102 flexes, causing the actuating arms 110 to move apart and the knobs 108 to open. This opening allows the caregiver 302 to place the pacifier 100 around the edge or surface of an object, such as a bib 202 or other accessible item. Once the pressure on the pressing surfaces 150 is released, the constricting force 404 exerted by the stretchable ring 112 causes the actuating arms 110 to return to their closed position, bringing the knobs 108 together and securing the pacifier 100 around the object.

The integration of the stretchable ring 112 as an internal biasing component eliminates the need for additional clips or fasteners, creating a self-contained pacifier that can be attached and removed with ease. This construction not only enhances safety by avoiding extra parts that could be cumbersome or uncomfortable but also provides a clean, streamlined design that caregivers can rely on for quick, hassle-free attachment. By keeping the pacifier 100 securely in place while making it accessible to the baby 304, this design optimizes usability for both the caregiver and the baby, ensuring comfort, safety, and convenience in a single device.

Figure 3:
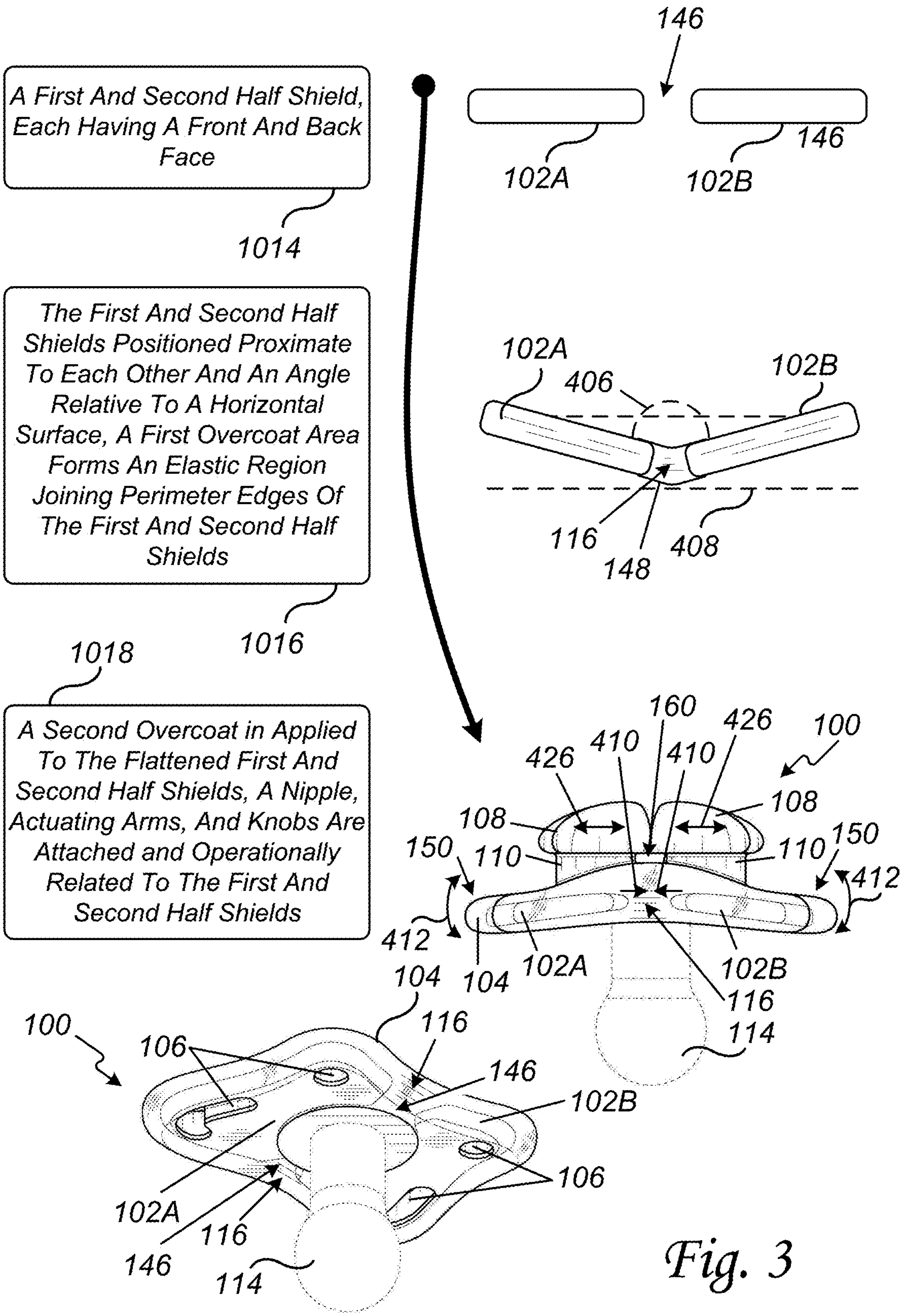

Referring to FIG. 3, there is illustrated one example of manufacturing the pacifier 100 with an integrated coupling mechanism. In an exemplary embodiment, the manufacturing process involves multiple steps, including forming a first half shield 102A and a second half shield 102B, bonding these shield halves with a first overcoat layer 116 that at least creates an elastic region 116, and finally adding a second overcoat layer 104 comprising the remaining components of the pacifier, which may include the nipple 114, actuating arms 110, knobs 108, and pressing surfaces 150. The second overcoat layer is applied in a manner as to avoid covering the majority of the elastic region 116, as may be required and/or desired in a particular embodiment, to complete the assembly. Each step in this process ensures the functionality, durability, and ease of use envisioned for pacifier 100.

In an initial step 1014, the first half shield 102A and the second half shield 102B are formed, each with a front face and a back face. These half shields are designed to come together as part of the pacifier's structural foundation, with each half positioned at an angle 406 relative to a horizontal reference surface 408, but separated by the shield gaps 146. This angled configuration prepares the shield halves 102A/102B to create an elastic region 116 having a compressive edge 148 when they are subsequently flattened. The half shields 102A/102B each include a portion of the shield opening 140, which will later house the nipple 114 and actuating arms 110. In certain embodiments, the half shields 102A/102B include perimeter walls 142 that will provide additional structural support to the actuating arms 110.

The front faces of the shield halves 102A and 102B provide a comfortable surface for contact with baby 304, while the back faces support the coupling mechanism 108/110/116 and pressing surfaces 150. In some embodiments, ventilation holes 106 are incorporated into the shield halves, positioned around the shield opening 140. These ventilation holes 106 allow airflow through the shield 102, helping to prevent moisture accumulation and improve comfort and hygiene. The initial structure of the half shields provides a stable framework for the pacifier 100 while allowing for controlled flexibility in the subsequent assembly steps.

In a subsequent step 1016, the first overcoat layer 116 is applied to join at least the perimeter edges of the first and second half shields, 102A and 102B, forming an elastic region 116 along their shared edge. In exemplary embodiments, there is a preponderance of the first overcoat layer 116 applied to the back face of the shield, with the material extending beyond the perimeter edges of the shield halves 102A and 102B and the elastic region 116 having a thicker portion proximate to the shield gaps 146. This first overcoat layer 116 bonds the shield halves together while maintaining flexibility at the joining point. After applying the first overcoat layer 116, the half shields are flexed to at least a horizontal position with respect to the horizontal reference surface 408 or greater to stretch the elastic region 116 and create a compressive edge 148 along one side. This flexing produces a biasing tension 410 that holds knobs 108 at rest in the closed position. The thickness of the elastic region 116 in combination with the material choice for the first overcoat layer 116 can be adjusted during manufacturing as needed to calibrate a desired biasing tension 410.

The elastic region 116 created by the first overcoat layer enables the shield halves 102A/102B to flex when pressure 412 is applied to the pressing surfaces 150, allowing the coupling mechanism 108/110/116 to operate by separating or drawing together the knobs 108. This flexible elastic region 116 applies a natural bias that causes the actuating arms 110 to return to a resting position, closing the knobs 108, when pressure is released, helping the pacifier 100 grip or release an object smoothly and reliably. This approach provides a balance of stability and controlled flexibility within the pacifier's structure.

In the final assembly step 1018, a second overcoat layer 104 is applied to the shield halves 102A and 102B which are flexed flat to even angled in the opposite direction—beyond flat (for manufacture). Once applied, the second overcoat layer 104 reinforces the structure and holds shield 102 in a stable and desirable configuration. The second overcoat layer 104 forms the nipple 114, actuating arms 110, and knobs 108. The addition of the knobs 108, in particular, holds pacifier 100 in a mostly flat position, biasing the elastic region 116 to close the knobs 108 in the absence of external pressure. The second overcoat layer 104 enhances the durability of pacifier 100 by adding structural support to the shield halves, ensuring that the pacifier 100 maintains its form during repeated use. The addition of this layer, while avoiding the elastic region 116, particularly along its back end, helps preserve the compressive edge 148 and the elastic region 116, both of which are essential for the coupling mechanism to operate consistently over time.

In an exemplary embodiment, the second overcoat layer 104 forms the nipple 114, actuating arms 110, and knobs 108 while also coating any remaining exposed surfaces on the front and back of the shield halves 102A and 102B for added comfort and structural stability. The nipple 114 extends outwardly through the shield opening 140, providing a soothing element for the baby 304 and positioning the pacifier 100 in an accessible orientation when attached to an object 202, such as a bib. The actuating arms 110, attached to the back face of the shield, extend from the opposite side of the shield opening 140 and are configured to move relative to each other in response to the flexing of the shield at the elastic region 116.

The knobs 108 are attached to the ends of the actuating arms 110 and are designed to open and close based on the movement of the actuating arms. A knob cavity 160, located between the bottom surface of the knobs 108 and the shield 102, allows fabric from a bib 202, blanket, or other object 202 to be captured when the pacifier 100 is attached. This cavity 160 improves the grip of the pacifier, as it enables the material of the attached object 202 to settle within the gap, enhancing the holding force applied by the knobs 108. The knobs 108 may also feature a textured surface, improving their grip on various materials and providing a secure attachment.

The completed assembly allows the pacifier 100 to function as an integrated coupling mechanism, providing a reliable, self-contained attachment solution. By combining the elastic region 116, compressive edge 148, and overcoat layers 104 and 116, the pacifier 100 achieves a balance of durability, flexibility, and ease of use, ensuring it remains comfortable for the baby 304 and convenient for the caregiver 302.

Figure 4:
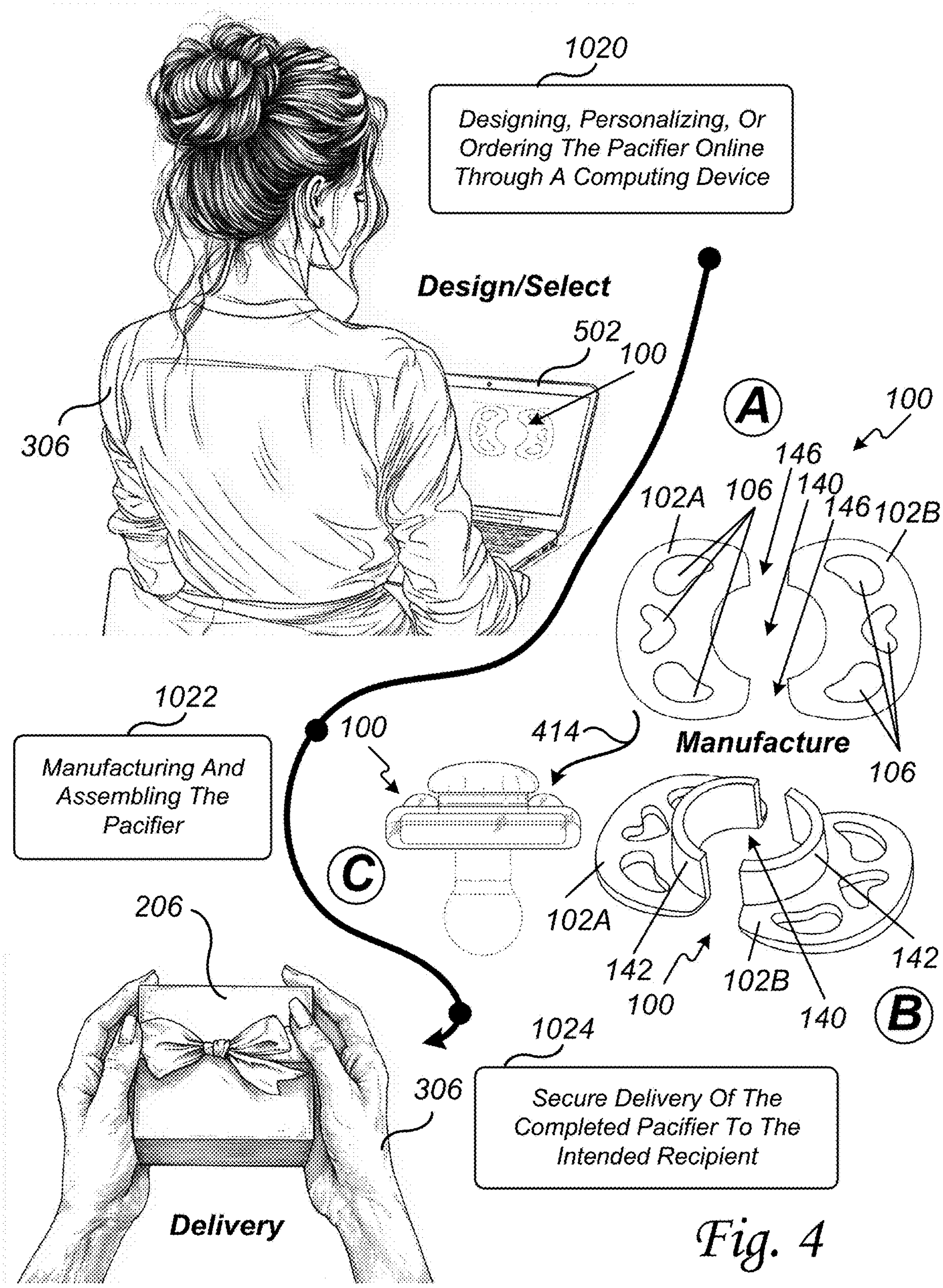
FIG. 4 illustrates one example of designing, personalizing, or ordering the pacifier with a coupling mechanism.

Referring to FIG. 4, there is illustrated one example of designing, personalizing, or ordering the pacifier 100 with an integrated coupling mechanism. In an exemplary embodiment, this process involves multiple stages, beginning with user 306 designing, customizing, or ordering the pacifier 100 online, through a website or other suitable application, by way of a computing device 502, followed by a detailed manufacturing and assembly process, and concluding with the secure delivery of the completed pacifier 100 to the intended recipient such as user 306. This process provides a comprehensive approach to delivering a tailored pacifier that meets specific functional and aesthetic preferences, ensuring satisfaction and convenience for caregivers and babies alike.

In an initial step 1020, the user 306 accesses an online platform through a computing device 502 to design, personalize, or order the pacifier 100. The computing device 502 may be any suitable electronic device, such as a laptop, tablet, smartphone, desktop computer, or other suitable computing device that provides a digital interface for the user to interact with. Through this online platform, user 306 can explore a variety of customization options, including colors, materials, and features specific to the pacifier's coupling mechanism and comfort elements. The interface may present visual previews, allowing the user to see a representation of the final product based on selected customizations.

The platform enables the user 306 to select features that align with their needs, whether it be a specific color scheme that complements the baby's wardrobe or materials that enhance the pacifier's comfort and durability. Options for customizing the shield 102, ventilation holes shape or design, nipple 114, actuating arms 110, knobs 108, and other types or kinds of design features may be provided, with features such as textured surfaces on the knobs for improved grip or choices in overcoat materials to provide a soft exterior. For example, the user 306 may be able to choose between shields that have a contoured symmetrical, contoured asymmetrical, or round shape and combine this with a preferred style of nipple, i.e. symmetrical, orthodontic, or round/cylindrical. This customization stage empowers user 306 to create a pacifier that fits their desired look and functionality, reflecting the inventor's vision of a user-centric design that adapts to individual caregiver 306 and baby 304 preferences.

In step 1022, once the design and customization options are confirmed, the order progresses to the manufacturing phase, represented by design reference 'A', manufactured parts reference 'B', and finished product reference 'C'. In reference 'A', the user's design choices are translated into precise production specifications that outline each component of the pacifier 100, from the shield 102 to the final assembly. These specifications include details such as material selections, structural dimensions, and the positioning of features like the shield opening 140, ventilation holes 106, the concave shape of the shield 102, and/or other design features.

In reference 'B', individual parts of the pacifier 100 are manufactured according to the specifications, using processes such as injection molding, over-molding, and two-shot molding to create each component with accuracy. The shield 102, for instance, may be molded with channel recesses 164 and ventilation holes 106 around the shield opening 140 to facilitate airflow and provide flexibility for the coupling mechanism. The first overcoat layer 116 may be applied during this step to join the first and second half shields 102A and 102B, forming an elastic region 116 that enhances the shield's ability to flex while providing a stable compressive edge 148. This layer allows the shield halves to operate cohesively while maintaining flexibility at the joining edge.

Additional components, including the actuating arms 110 and knobs 108, are also manufactured with precision to ensure reliable functionality of the coupling mechanism. The actuating arms 110 are designed to move in response to pressure applied to pressing surfaces 150 on the shield 102, allowing the knobs 108 to transition smoothly between open and closed positions. The knobs 108, molded with a textured surface and positioned to fit securely over an object like a bib 202, are configured to enhance grip through a knob cavity 160. This cavity is designed to capture fabric or material from the object 202, further increasing the pacifier's holding force once attached.

In reference 'C', the assembly process brings together the manufactured components into the final pacifier 100. In some embodiments, attaching the nipple 114 through the shield opening 140 and connecting the actuating arms 110 and knobs 108 is required while in other embodiments, they can be molded in place as part of the overcoat process. In operation, the nipple 114, the actuating arms 110, and knobs 108 operate together as part of the integrated coupling mechanism. The second overcoat layer 104 can be applied at this stage, reinforcing the structure and holding the shield halves 102A and 102B in a stable configuration. This second layer enhances durability, ensuring the pacifier 100 can withstand repeated use while maintaining its flexibility for operation. Quality control checks are typically conducted at this stage, confirming that each component meets both functional requirements and user-selected customization details, ensuring a high-quality final product.

In step 1024, once manufacturing and assembly are complete, the pacifier 100 is packaged and prepared for delivery to the intended recipient such as user 306, as represented by step 1024. Delivery may be conducted through various shipping methods based on the user's location, preferences, and order specifications. In some embodiments, the pacifier 100 may be packaged in protective material to prevent any potential damage during transit, safeguarding components such as the shield 102, nipple 114, actuating arms 110, and knobs 108.

The delivery step is designed to ensure a seamless process, from the initial customization to the final arrival of the personalized pacifier 100 at the user's location. The pacifier 100 is delivered ready for immediate use, allowing the user 302 to enjoy the benefits of a customized, durable, and functional pacifier that meets the specific needs and preferences outlined in the initial design process. This delivery phase underscores the convenience and accessibility of the ordering process, providing caregivers with a tailored product that can be easily integrated into daily routines.

Through the steps of design, manufacturing, and delivery, the process illustrated in FIG. 4 highlights an approach that aligns with user preferences and enhances the practicality of the pacifier 100. By combining a personalized design platform, precise manufacturing, and efficient delivery, this process ensures that caregivers receive a pacifier that not only meets their functional needs but also offers a unique, individualized experience for both caregiver 302 and baby 304.

Figure 5:
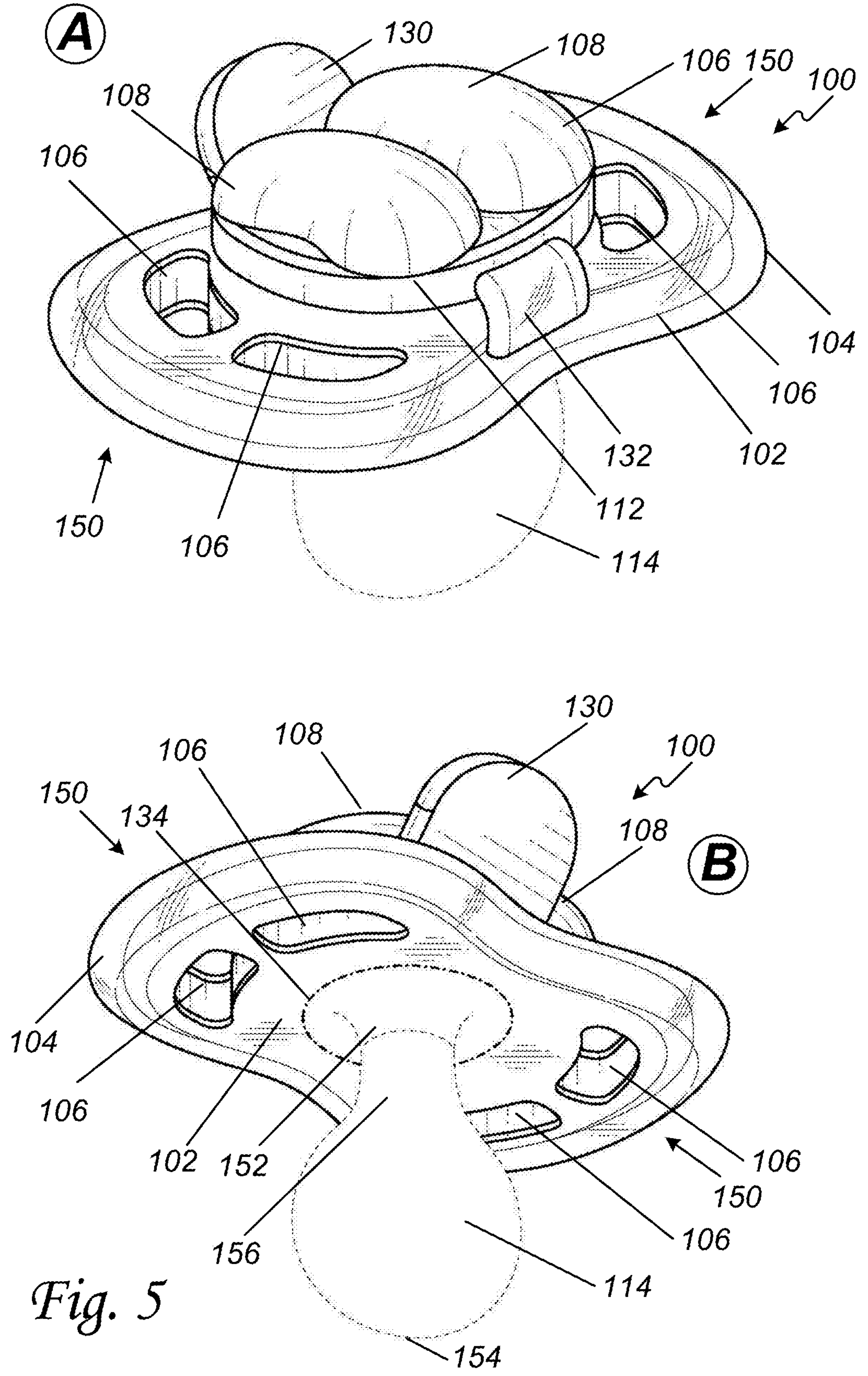
FIG. 5 illustrates one example of two perspective views of the pacifier with a coupling mechanism.

Referring to FIG. 5, there are two perspective views of the pacifier 100 with a coupling mechanism 108/110/112. Reference 'A' illustrates the back face of the pacifier 100, while Reference 'B' shows the front face. In an exemplary embodiment, the pacifier includes a shield 102, which is configured with a front and back face to provide structural integrity and flexibility to the device. The shield further includes an overcoat layer 104, enhancing both durability and comfort for the user. Distributed around the shield 102 are ventilation holes 106, which facilitate airflow, helping to maintain a dry surface and reduce moisture buildup during use.

The shield 102 also features two actuating arms 110, which are coupled to knobs 108 positioned on the back face side of the shield opening 140. The actuating arms 110 move relative to each other, allowing the knobs 108 to open and close depending on the user's interaction. In some embodiments, the perimeter walls 142, which may be integrally formed with the shield 102 or shield halves 102A/102B, contribute to structural reinforcement of the actuating arms 110. The presence of the knob cavity 160 creates a gap between the two actuating arms 110, allowing the actuating arms to flex outwardly and inwardly without binding or applying compression to each other, the object 202, the baby 304, or any other component ensuring smooth, secure, and safe operation.

A stretchable ring 112 is fitted around the knobs 108 and actuating arms 110, applying a constricting force 404 that draws the knobs 108 together in the absence of external pressure, securing the pacifier to an object like a bib 202. To facilitate the installation and removal of the stretchable ring 112, a large tab 130 and a hinge 132 connect the stretchable ring 112 to the shield by way of the overcoating material. The hinge 132 functions as an attachment point and hinge so that ring 112 can be removed from around the actuating arms yet remain bonded to the shield 102, preventing ring 112 from posing a choking hazard should it come undone from the actuating arms 110 in the presence of baby 304.

The nipple 114 is centrally located on the front face of the shield 102, extending from the shield opening 140 and anchored by a nipple base 134, which provides a seamless connection between the nipple 114 and the shield 102 or its overcoat 104. The nipple 114 includes several distinct sections designed for flexibility, comfort, and effective use by the baby 304. Directly above the nipple base 134 is the nipple flexion region 152, which is designed to absorb energy and offer flexibility during use. Above the nipple flexion region 152 is the nipple shaft 156, which extends upwardly and provides structural continuity between the flexion region and the nipple tip 154. The nipple shaft 156 contributes to the overall shape and usability of the nipple, providing a gradual transition toward the nipple tip 154. The nipple tip 154, positioned at the top and furthest point from the shield 102, serves as the primary contact surface for the infant.

The nipple flexion region 152, combined with the structure of the nipple shaft 156 and the placement of the nipple tip 154, allows for controlled bending and stretching of the nipple 114, enhancing comfort and adaptability. This design ensures that the pacifier remains comfortable in the baby's mouth while maintaining the flexibility needed for dynamic movement during use.

Additionally, the knobs 108 include a knob cavity 160 positioned between the knobs' bottom surface and the nipple 114. This cavity 160 allows fabric or material from an object, such as a bib 202, to be captured within the gap, enhancing the gripping force and stability of the pacifier when attached. The overall configuration of FIG. 5 demonstrates the pacifier's ability to remain securely in place on various objects while offering the necessary comfort and convenience for both caregivers and infants.

Figure 6:
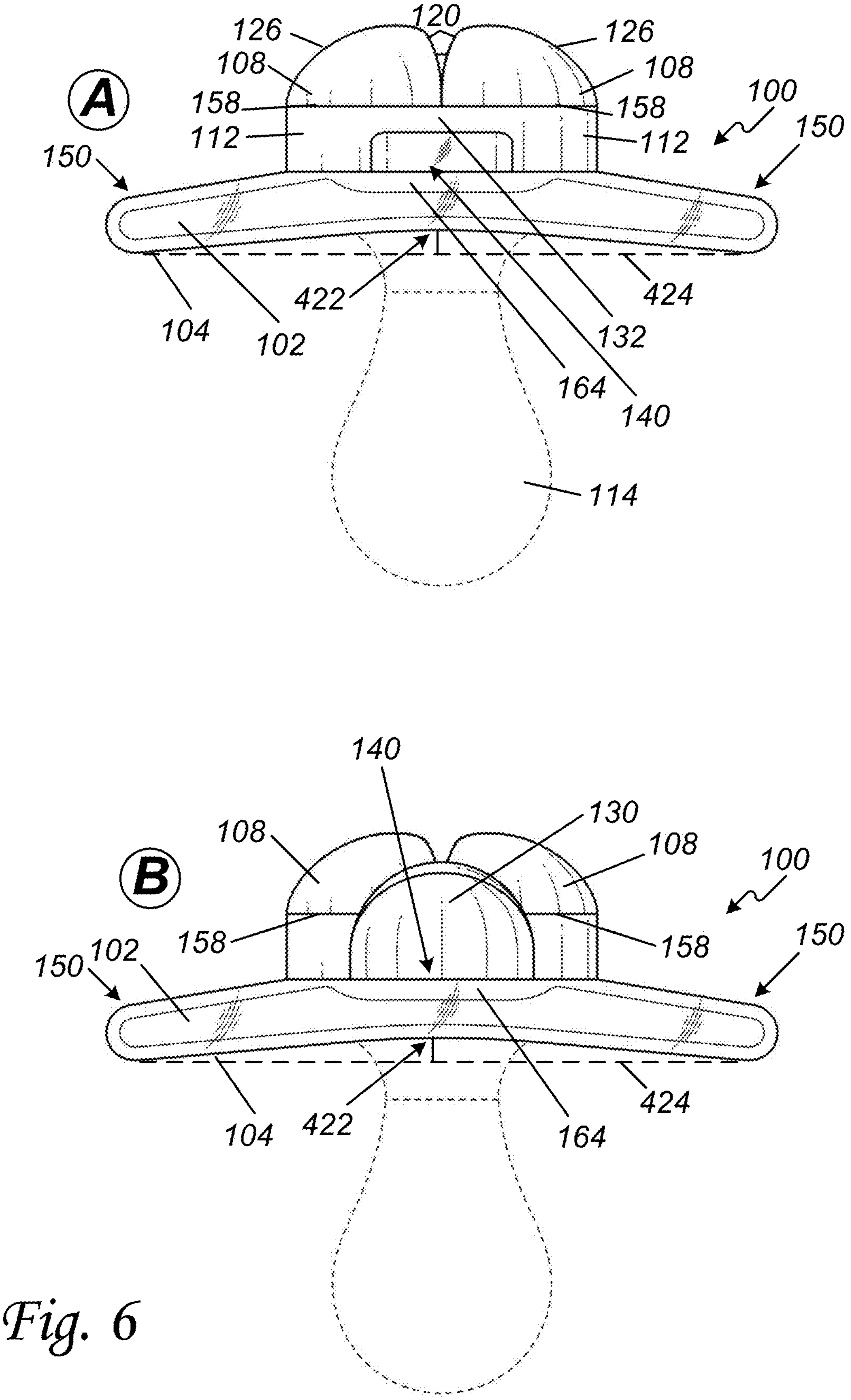
FIG. 6 illustrates one example of a front and back view of the pacifier with a coupling mechanism.

Referring to FIG. 6, there is illustrated one example of a front view in reference 'A' and a back view in reference 'B' of the pacifier 100 with an integrated coupling mechanism 108/110/112. In an exemplary embodiment, the pacifier 100 includes carefully engineered structural and functional elements that work together to provide secure attachment, comfort, and ease of use for both the caregiver and the baby.

In reference 'A', the front view shows the nipple 114 extending outwardly from the shield 102 proximate to the central shield opening 140. The nipple 114 is designed with multiple sections to enhance both comfort and functionality. Starting from the base, the nipple is anchored by a nipple base 134, which provides a stable connection to the shield 102 and/or its overcoat 104. Above the nipple base 134, a nipple flexion region 152 allows for controlled bending and stretching, providing resilience and flexibility when the baby interacts with the pacifier. This flexion region 152 transitions into the nipple shaft 156, which provides structure and shape, leading up to the nipple tip 154, the furthest point from the shield 102. The nipple tip 154 serves as the primary contact surface for the baby, while the flexion region 152 and shaft 156 together allow the nipple to accommodate natural movement without losing stability or comfort.

In some embodiments, the wall gap 162 is positioned between the actuating arms 110 and the wall of the shield opening 140. This gap is configured to allow the actuating arms to flex outward during the opening position of the knobs 108, preventing binding or obstruction against the shield opening 140. The wall gap 162 also facilitates smooth movement of the actuating arms, enhancing the functionality of the coupling mechanism and ensuring consistent operation under varying conditions.

Shield 102 itself is designed with both durability and comfort in mind. It includes an overcoat layer 104 that provides a soft exterior surface, enhancing durability and making the pacifier comfortable to touch. Additionally, a series of ventilation holes 106 are distributed around the shield opening 140, promoting airflow to help keep the area around the baby's mouth dry and comfortable, reducing the risk of irritation from moisture buildup. The shield 102 is slightly concave 422 from a reference line 424, angling toward the nipple 114, which provides ergonomic support for the pacifier to rest naturally against the baby's face.

In reference 'B', the back face of the pacifier 100 shows two actuating arms 110 that extend from the shield opening 140 and connect to knobs 108 positioned on the opposite side. The actuating arms 110 are configured to move outwardly when the shield 102 flexes at channel recesses 164, allowing the knobs 108 to open. The knob cavity 160 extends between the actuating arms 110, providing an opening to prevent interference between the actuating arms and objects placed between the knobs 108. This allows the actuating arms 110 to move between open and closed positions smoothly, enabling consistent biasing tension 410 between the knobs 108.

Each knob 108 features a knob head 126 at its outermost surface, providing stability and a textured gripping surface to improve attachment to various materials, such as a bib 202 or other clothing. Surrounding the outer periphery of each knob 108 is an outer gripping edge 120, which functions to create a secure attachment that is also gentle due to the curvature preventing small pieces of skin from accidentally getting pinched. Positioned along the inner periphery of each knob 108 is the inner gripping edge 124, which plays a significant role in gripping due to the angle of the edge pressing into objects to create a secure hold. In exemplary embodiments, the surface of the knob head 126 is made of a soft, flexible material, which enhances the combined function of the outer gripping edge 120 and the inner gripping edge 124 in creating a secure yet gentle grip on objects. Additionally, a knob cavity 160 is located between the bottom surface of the knobs 108 and the shield 102. Together, the outer gripping edge 120, inner gripping edge 124, and knob cavity 160 enable fabric from an object to be captured within the gap when the pacifier is attached, enhancing the holding force exerted by the knobs 108. This design minimizes slippage, prevents dislodging during movement, and ensures the pacifier remains securely in place on various objects, providing both reliability and safety in attachment.

Additionally, each knob 108 includes knob lips 158 along the edge that contacts the stretchable ring 112. These knob lips 158 create a secure interface between the knobs 108 and the stretchable ring 112, which provides a biasing mechanism to keep the knobs 108 in the closed position in the absence of external pressure. The stretchable ring 112 applies a constricting force 404 around the actuating arms 110, drawing the knobs together and securing the pacifier 100 onto an object. This self-contained mechanism allows for easy attachment without requiring additional fasteners or clips, making it simple for the caregiver to operate.

To assist with the installation and removal of the stretchable ring 112, a large tab 130 and a hinge 132 are attached to or integrally formed with the ring. The large tab 130 offers a broad gripping surface for the caregiver, allowing the ring to be easily positioned or adjusted, while the hinge 132 provides finer control for precise placement, because it holds the stretchable ring in a specific orientation relative to the shield, even when it is detached from the knob. These tabs make it convenient for the caregiver to install or remove the ring as needed, facilitating cleaning and maintenance of the pacifier 100.

The back face of shield 102 also includes pressing surfaces 150 positioned on either side, which allow the caregiver to apply pressure to operate the coupling mechanism 108/110/112. When the caregiver presses these surfaces, the shield 102 flexes at the channel recesses 164, causing the actuating arms 110 to move apart and open the knobs 108. This action allows the caregiver to quickly and easily attach or detach the pacifier 100 from an object. Upon releasing the pressing surfaces 150, the stretchable ring 112 draws the actuating arms 110 and knobs 108 back into the closed position, ensuring a secure attachment.

Figure 7:
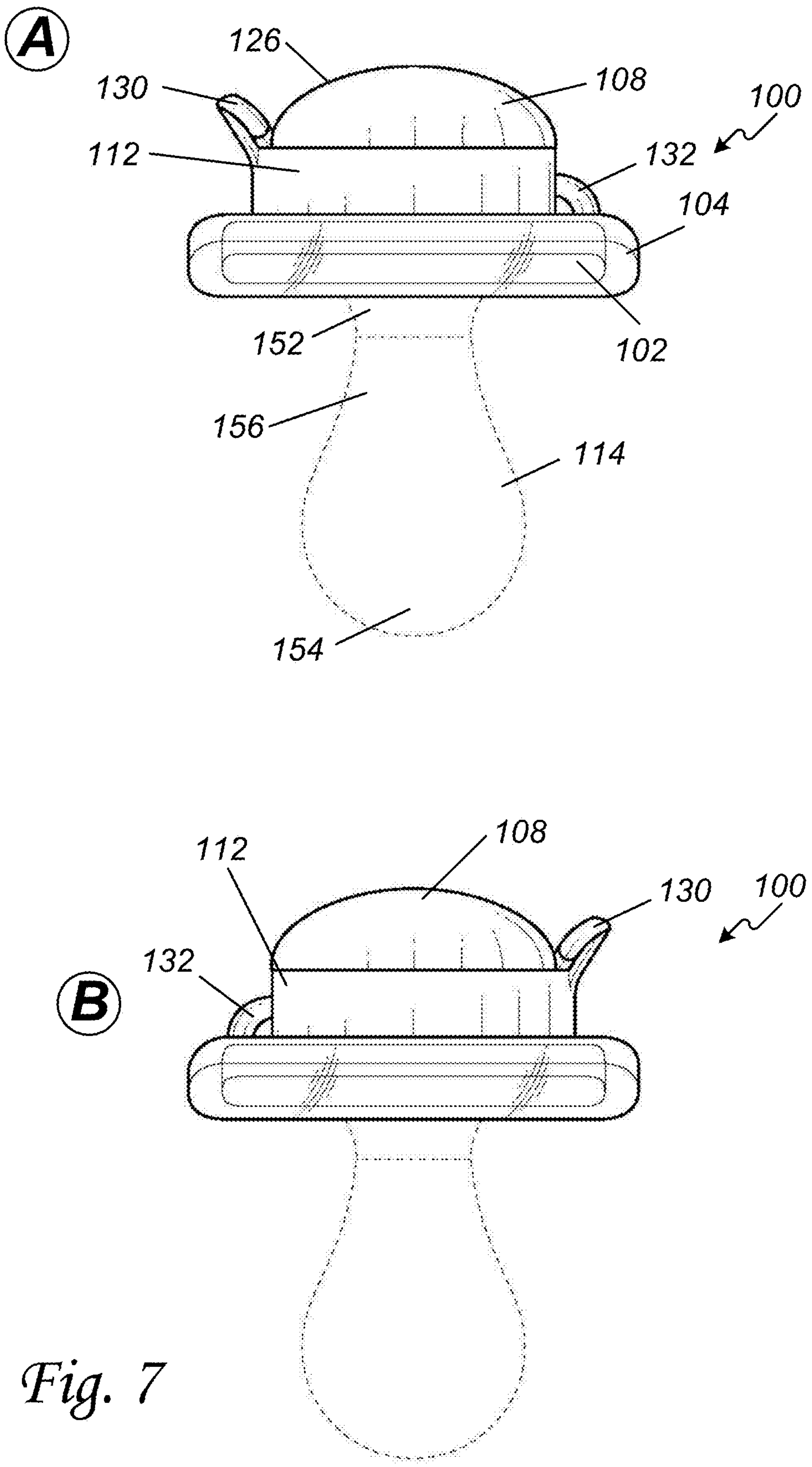
FIG. 7 illustrates one example of a right and left side view of the pacifier with a coupling mechanism.

Referring to FIG. 7, there is illustrated one example of a right side view in reference 'A' and a left side view in reference 'B' of the pacifier 100 with an integrated coupling mechanism 108/110/112. In an exemplary embodiment, the side views provide additional perspective on the pacifier's structural elements, showcasing the profile and interaction of key components that contribute to its functionality and ease of use.

In both views, the shield 102 can be seen with its slight concave shape, which angles toward the nipple 114 and provides ergonomic support when the pacifier 100 is in use. The nipple base 134 is visible where the nipple 114 connects to the shield 102, ensuring stability and secure attachment to the shield or its overcoat layer 104/116. The nipple shaft 156 extends outward from the nipple base 134 and leads to the nipple tip 154, positioned at the furthest point from the shield 102, which serves as the primary contact surface for the baby. The nipple flexion region 152, located between the nipple base 134 and nipple shaft 156, allows for controlled movement and flexibility, enhancing comfort for the baby during use as well as smooth and efficient opening and closing of the coupling mechanism.

The side views highlight the knobs 108 positioned on the back face of the shield 102, which are connected to the actuating arms 110. Each knob 108 features a knob head 126 at its outermost surface, providing stability and a textured grip. Surrounding the perimeter of each knob 108 is the outer gripping edge 120 and an inner gripping edge 124, which together function to prevent highly concentrated pressure or pinch during attachment to ensure safety and comfort in case of attachment to skin while also contributing to the overall grip on fabrics or other materials when the pacifier 100 is secured. Additionally, the inner gripping edge, located along the inner circumference of the knob 108, plays a more critical role in ensuring a firm hold on the attached object. Positioned between the knobs 108 and the shield 102 is the knob cavity 160, which provides space for fabric or other material to be captured securely within the gap. Together, these features enhance the pacifier's holding force, minimizing slippage and ensuring a reliable attachment during use.

The stretchable ring 112 surrounds the actuating arms 110 and knobs 108, applying a consistent constricting force 404 that draws the knobs together when no external pressure is applied. The knob lips 158, located along the inner edge of each knob 108 where they contact the stretchable ring 112, create a stable connection, ensuring the stretchable ring 112 reliably maintains its position and exerts the necessary force to hold the pacifier in a closed position.

The side views also display the pressing surfaces 150 on the shield 102, positioned on each side to allow the caregiver to operate the coupling mechanism 108/110/112 with ease. By applying pressure to these surfaces, the shield 102 flexes at the channel recesses 164, enabling the actuating arms 110 to move outward and the knobs 108 to open. This functionality provides a quick and effective way for the caregiver to attach or detach the pacifier from an object, such as a bib 202.

Overall, the side views in FIG. 7 illustrate the profile of each component, demonstrating how the shield 102, nipple 114, actuating arms 110, knobs 108, stretchable ring 112, and other elements work together within a compact and user-friendly design. These perspectives highlight the pacifier's ability to maintain secure attachment while being easily accessible and comfortable for both caregiver 302 and baby 304.

Referring to FIG. 8, there is illustrated one example of a bottom or a back face view in reference 'A' and a top or front face view in reference 'B' of the pacifier 100 with a coupling mechanism 108/110/112. In an exemplary embodiment, pacifier 100 features carefully contoured components designed to improve grip, attachment, and comfort, enhancing functionality for both baby 304 and the caregiver.

In reference 'A', the bottom or back face view of the shield 102 reveals the structural elements of the coupling mechanism, which includes the knobs 108, actuating arms 110, and stretchable ring 116. The knob contact edge 118 is positioned along the edges of each knob 108, which may provide a textured or ridged area designed to improve the grip on objects like a bib 202 or other fabric surfaces. This knob contact edge 118 ensures that when knobs 108 are in the closed position, they exert a secure, stable hold, minimizing any slippage when attached to fabrics or other suitable materials. Additionally, when the knobs 108 are in a closed position, the knob contact edges 118 are at an angle that recesses their contact point from the outer surface of the knobs 108. This angled contact in combination with the curvature of the outer gripping edge 120 evenly distributes pressure and prevents small pieces of skin from becoming pinched.

Between the adjacent knobs 108 is a contoured between-knobs indent 416, creating a smooth, inwardly contoured recess that transitions seamlessly from one knob to the other. This design allows the adjacent knobs to form a continuous, rounded recess, enabling the pacifier to maintain a secure hold while distributing pressure more evenly across the gripping surface. The contoured indent 416 helps prevent fabric bunching and enhances the pacifier's ability to securely hold onto an object without exerting uneven pressure.

Each knob 108 also includes a contoured knob indent 418 located on the opposite side of the knob contact edge 118. These contoured indents 418 create a smooth recess that allows gripped surfaces, such as a bib 202 or other object 202, to fit more snugly around each knob 108 and sit closer to the shield 102. This closer fit improves the overall stability and grip of the pacifier 100 by allowing the fabric to encroach around the knobs, reducing the likelihood of detachment and providing a tighter, more reliable connection to the object.

At the upper corners of each knob 108 are the knob head corners 122, which are designed to assist users in handling and maneuvering the pacifier 100 as well as improve stability and smooth functioning. When combined with the knob lips 158, the knob head corners 122 create a barrier that holds the ring 112 securely in place, allowing for smooth and consistent opening and closing as the actuating arms 110 are engaged by the caregiver 302. The knob head corners 122 also contribute to the grip and stability of the pacifier 100 by providing a broad surface area that, when combined with the contoured indentations and knob contact edge 118, ensures that the pacifier provides a secure hold when attached to objects.

In reference 'B', the top or front face view of pacifier 100 highlights additional ergonomic and comfort-focused features, such as the contoured nose recess 420 positioned along the edge of the shield 102A/102B. This nose recess 420 is designed to improve comfort for baby 304 by creating a slight contour that avoids contact with the baby's nose during use. By allowing a natural space around the baby's nose, the contoured recess 420 minimizes the potential for irritation or discomfort, supporting longer and more comfortable use of the pacifier.

Additionally, the shield 102 shows a slight concave design that angles toward the nipple 114 to ensure a comfortable fit against the baby's face. The shield's ventilation holes 106 are distributed around the shield opening 140, which helps maintain airflow, keeping the area around the baby's mouth dry and reducing moisture accumulation. This concave contour, combined with the nose recess 420, reflects the inventor's vision for a pacifier that prioritizes the baby's comfort while maintaining a secure and reliable attachment mechanism for the caregiver.

Together, these components—the knob contact edge 118, contoured between-knobs indents 416, contoured knob indents 418, knob head corners 122, and contoured nose recess 420—illustrate a pacifier design that effectively balances security, functionality, and comfort. The thoughtful contouring of each component allows the pacifier 100 to function as a reliable and comfortable attachment solution that meets the needs of both the caregiver and the baby.

Figure 9:
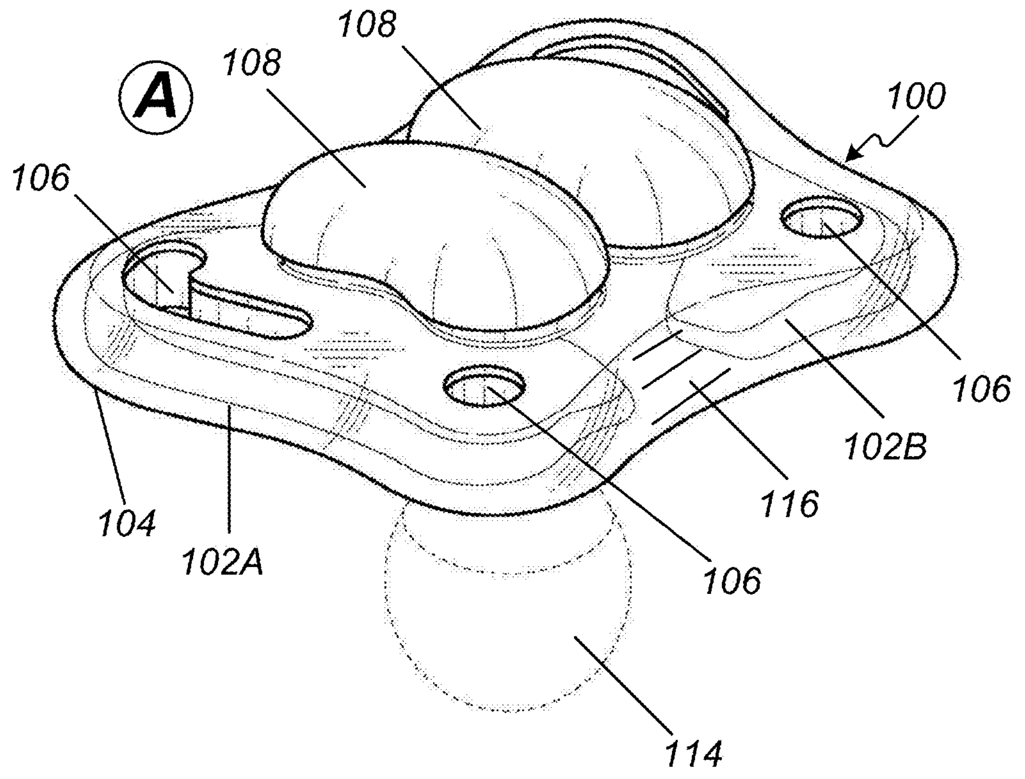
FIG. 9 illustrates one example of two perspective views of the pacifier with a coupling mechanism.
Figure 9:
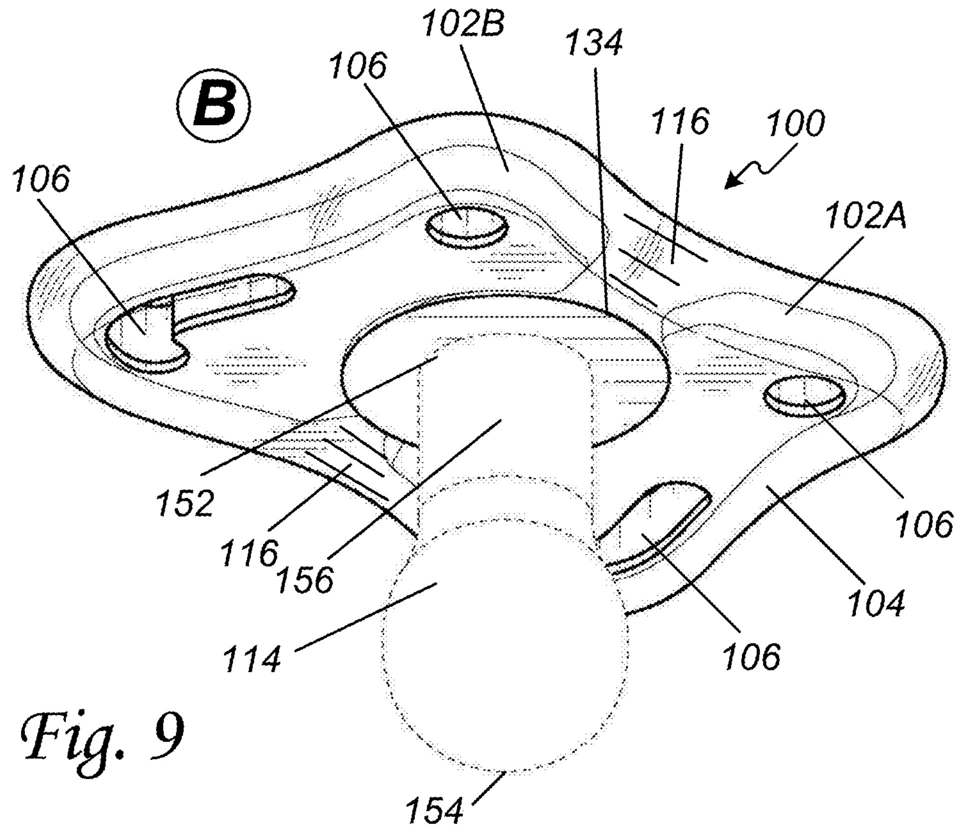

Referring to FIG. 9, there are two perspective views of the pacifier 100 with a coupling mechanism 108/110/116. Reference 'A' illustrates the back face of the pacifier 100, while Reference 'B' shows the front face. In an exemplary embodiment, the pacifier 100 includes a shield 102 with several integrated features that enhance both its functionality as a coupling mechanism and its comfort for use by infants.

In Reference 'A', the back face of the pacifier 100 highlights the coupling mechanism 108/110/116, which comprises the knobs 108, actuating arms 110, and elastic region 116. The knobs 108 are attached to the ends of the actuating arms 110 and feature a knob contact edge 118 along their interior edges. This knob contact edge 118 can be textured or ridged to enhance the pacifier's hold on objects such as a bib 202 or other fabrics, ensuring a stable attachment when the pacifier 100 is in the closed position. The knob head corners 122 are positioned at the uppermost points of each knob 108, providing a convenient grip for users during handling or attachment. The corners also provide a broad surface to the back of the knobs, which further stabilize the pacifier's grip when in use. Together, these features ensure both functional reliability and user-friendly operation.

In Reference 'B,' the front face of the pacifier 100 is visible, emphasizing comfort and safety features for baby 304. Extending outwardly from the shield opening 140 is the nipple 114, designed with multiple regions to maximize flexibility and comfort. The nipple 114 is anchored to the shield 102 at the nipple base 134, providing stability and a seamless connection with the shield 102. Above the nipple base 134 is the nipple flexion region 152, which allows controlled bending and stretching when the coupling mechanism 108/110/116 is in use, enabling smooth operation of the knobs 108 and actuating arms 110. The nipple shaft 156 extends from the flexion region 152, offering structural continuity, and leads to the nipple tip 154, the furthest point from the shield 102 and the primary contact area for the baby.

Figure 10:
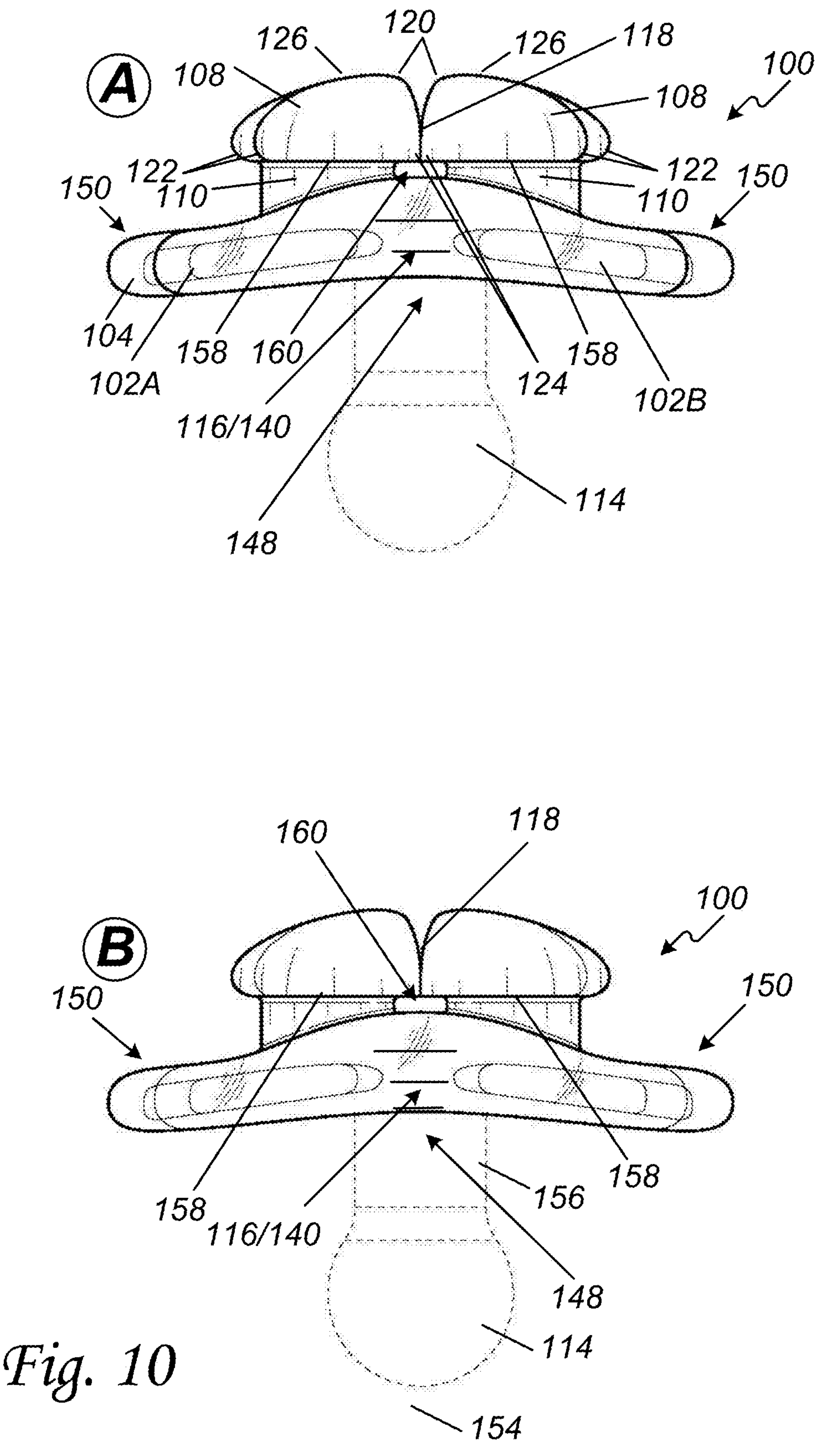
FIG. 10 illustrates one example of a front and back view of the pacifier with a coupling mechanism.

Referring to FIG. 10, there is illustrated one example of a right side view in reference 'A' and a left side view in reference 'B' of the pacifier 100 with an integrated coupling mechanism. In an exemplary embodiment, the pacifier 100 comprises various structural features and materials to ensure a secure and comfortable fit, as well as ease of use for both the caregiver and infant.

In Reference A, the right side view highlights the structural composition of the first half shield 102A and second half shield 102B, joined at the elastic region 116. The shield halves are initially positioned at an angle with a shield gap 146 between them and bonded together through a first overcoat layer/elastic region 116, which allows flexibility and provides a natural bias that draws the pacifier's knobs 108 toward a closed position. In some embodiments, a second overcoat layer 104 is applied to the front face and/or back face of the shield 102A/102B, enhancing durability and providing a smooth, soft surface that is gentle against the infant's skin and enhances a user's comfort when pressing the pressing surfaces 150. The second overcoat layer 104 can form the knobs 108, the actuating arms 110, and the nipple 114, ensuring an integrated and seamless design that improves structural integrity and functionality.

At the center of the shield is the shield opening 140, which allows the nipple 114 to extend outward. The nipple 114 comprises several key areas designed for comfort and flexibility: beginning with the nipple base 134 that anchors the nipple to the shield, followed by the nipple flexion region 152, which allows controlled bending. Above the flexion region is the nipple shaft 156, leading to the nipple tip 154 at the furthest point from the shield. These regions provide the necessary resilience and structure for comfortable use by the infant.

The pacifier's coupling mechanism involves actuating arms 110, which are attached to the back of the shield 102 and extend toward the knobs 108. Each knob 108 features a knob contact edge 118 along its edge, providing an enhanced grip on objects such as a bib or fabric. The knob contact edge 118 is recessed from the outer surface of the knobs 108 to prevent the possibility of small pieces of skin becoming pinched. Surrounding each knob is an outer gripping edge 120, further enhancing safety and improving stability by ensuring the knobs can hold onto various materials securely.

Additionally, the knobs 108 include knob head corners 122 along their outermost points, which add structural integrity and prevent slippage when being held or used. The knob lips 158 are positioned along the inner edge of each knob 108, making it easier for users to grip the pacifier 100.

Positioned between the knobs 108 and the shield 102, a knob cavity 160 provides space for fabric or other material to settle, enhancing grip when the pacifier is attached to items such as a bib. The compressive edge 148 of the shield halves is also visible, created during the assembly when the shield halves 102A and 102B are joined and flattened. While the compressive edge 148 contributes to the pacifier's structural stability, the bias of the knobs 108 toward the closed position is primarily maintained by the stretching of the elastic region 116, which applies opposing forces to draw the knobs together when no external pressure is applied.

The pressing surfaces 150 are located on either side of the shield 102. A caregiver can press these surfaces to flex the shield at the elastic region 116, causing the actuating arms 110 to separate the knobs 108 and allowing attachment or detachment from an object.

Together, the features in FIG. 10 illustrate a pacifier design that is both secure and comfortable, balancing user-friendly operation for the caregiver and ergonomic comfort for the infant. The integration of the elastic region 116, compressive edge 148, and other contoured surfaces supports reliable attachment and effortless operation.

Figure 11:
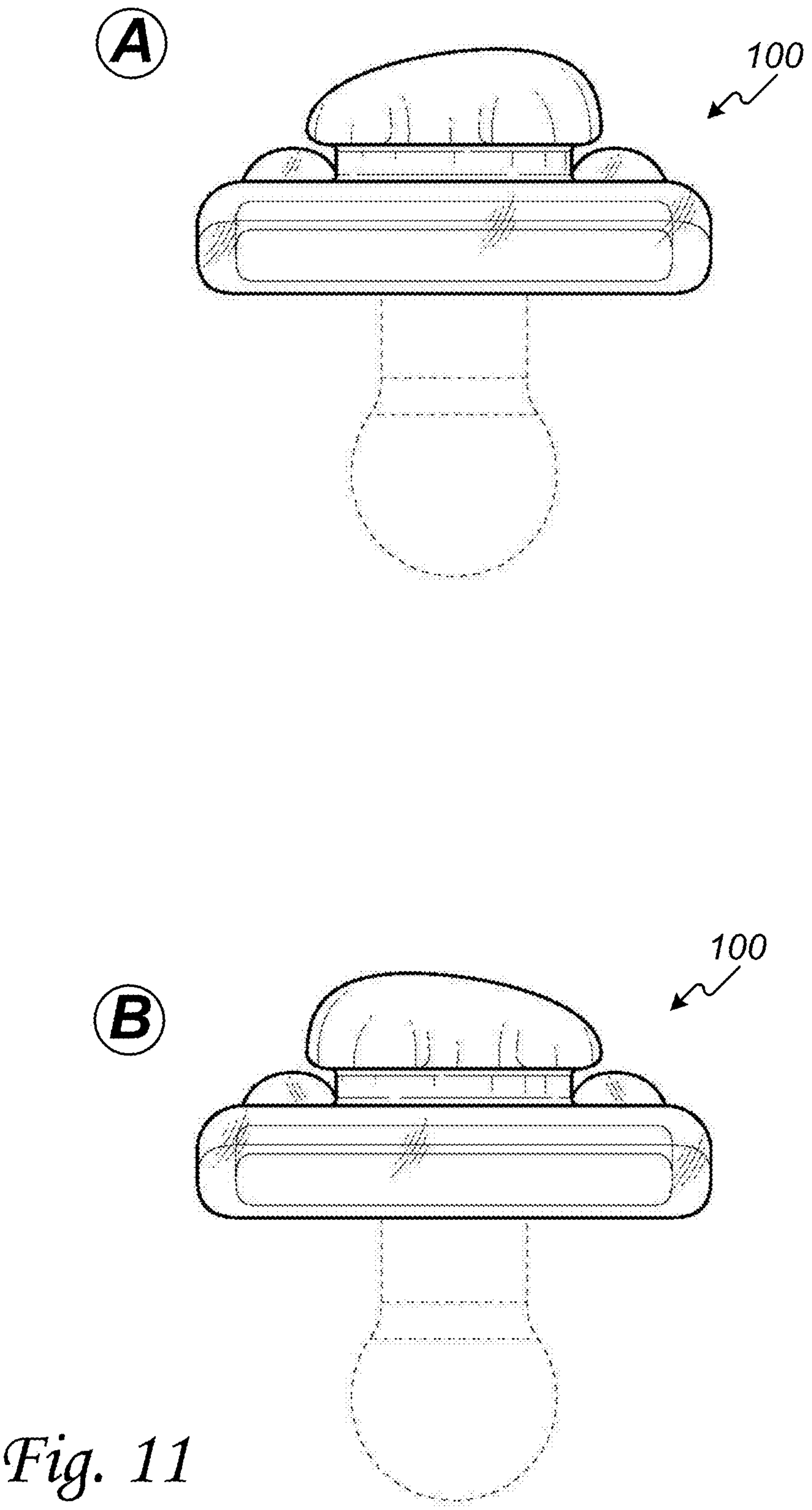
FIG. 11 illustrates one example of a right and left side view of the pacifier with a coupling mechanism.

Referring to FIG. 11, there is illustrated one example of a right and left side view of the pacifier 100 with a coupling mechanism 108/110/116.

Figure 12:
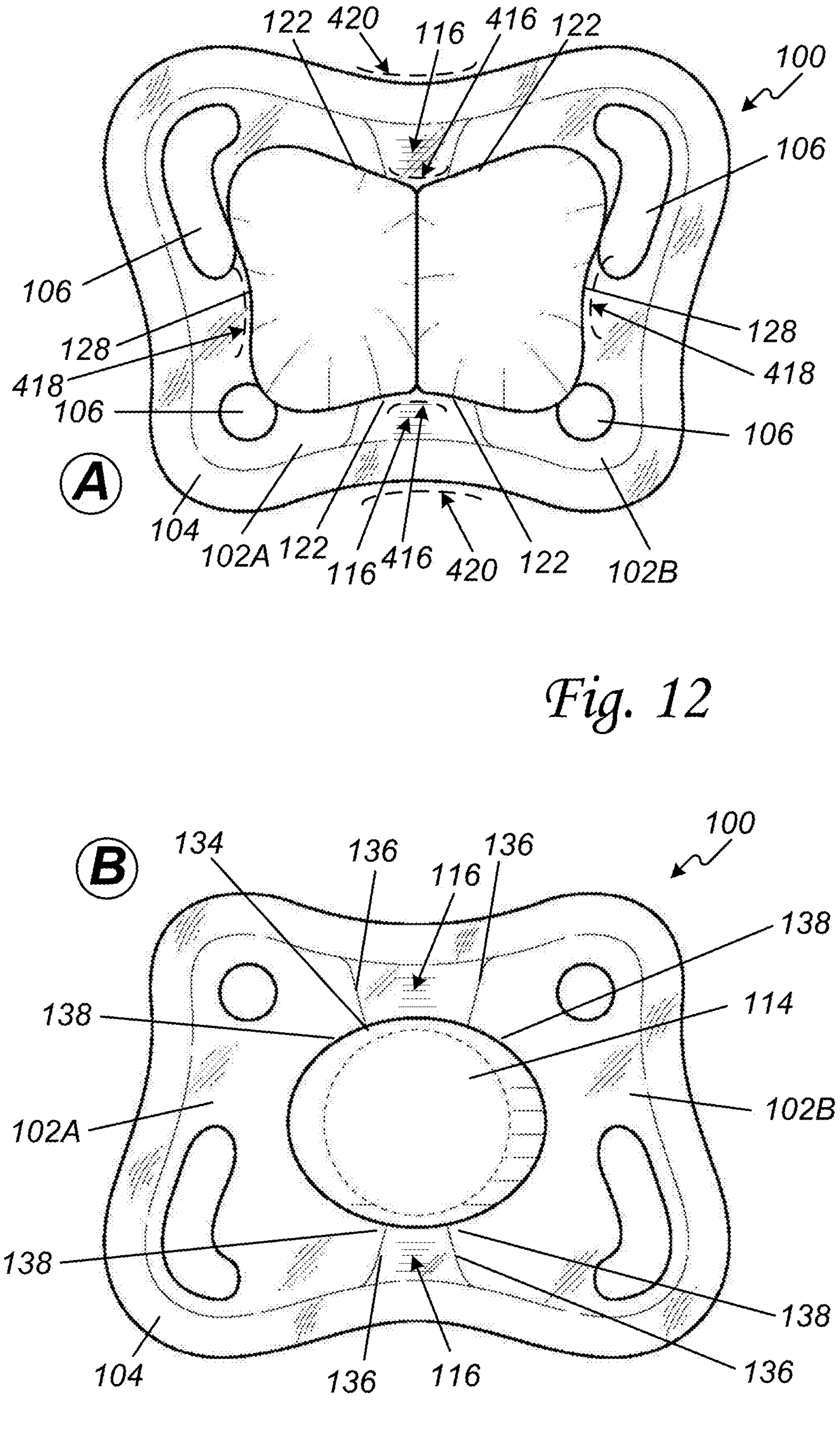
FIG. 12 illustrates one example of a bottom or back face view and a top or front face view of the pacifier with a coupling mechanism.

Referring to FIG. 12, there is illustrated one example of a bottom or a back face view in reference 'A' and a top or front face view in reference 'B' of pacifier 100 with a coupling mechanism 108/110/116. In an exemplary embodiment, pacifier 100 comprises various structural elements designed to provide secure attachment, ergonomic comfort, and ease of use.

In reference 'A', the bottom or back face view, the knob head corners 122 are located at the outer edges of each knob 108 and are designed to assist users in handling and maneuvering the pacifier 100 as well as enhancing stability and preventing slippage when the pacifier is attached to an object. The actuating arms 110 extend from the back of the shield, enabling the coupling mechanism to function by allowing the knobs 108 to move apart when the shield is flexed at the elastic region 116. Additionally, the contoured knob indents 418 provide recessed areas on the knobs, allowing fabrics or materials, such as those from a bib, to fit snugly around the knobs. These contoured indents improve grip and stability, ensuring a secure and reliable attachment.

At the shield's edge, a nose recess 420 provides a contoured area that avoids contact with the baby's nose, enhancing comfort during use. The contoured surfaces and recessed areas around the edges, such as the contoured recess 416 on the knobs, allow for smooth transitions, enabling a secure but gentle grip on the fabric or object to which the pacifier is attached.

In reference 'B', the top or front face view, the first half shield 102A and second half shield 102B are joined by the elastic region 116, which allows for controlled flexibility. This elastic region provides a natural closing bias for the knobs 108, maintaining the pacifier in a closed position when not in use. The overcoat layer 104 covers the remaining parts of the shield 102A/102B, adding durability and a soft, comfortable surface for users.

The nipple 114 extends through the center of the shield, starting from the nipple base 134 and culminating in the nipple tip 154. The nipple design includes a nipple flexion region 152 that provides controlled movement, enhancing ease of use. Surrounding the shield are ventilation holes 106, promoting airflow to help reduce moisture accumulation around the baby's mouth.

Together, these features-shield 102A/102B, elastic region 116, nipple 114, knobs 108 with contoured and recessed surfaces, ventilation holes 106, and nose recess 420—illustrate a pacifier designed for both functionality and comfort, meeting the needs of the caregiver for ease of use and the baby for secure attachment and comfort.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A pacifier with an integrated coupling mechanism, comprising:

a shield having a front face, a back face, a shield opening, and one or more ventilation holes, the shield comprising a first half shield and a second half shield, the first and second half shields being joined by a first overcoat layer that forms an elastic region along the first half shield and the second half shield, wherein the first overcoat layer enhances the flexibility of the shield along its median and facilitates the operation of the coupling mechanism, wherein the first overcoat layer introduces a biasing tension when the shield is flexed, creating a compressive edge;

a nipple attached to and extending outwardly from the front face;

a pair of actuating arms attached to and extending outwardly from the back face; and a pair of knobs, wherein each actuating arm of the pair of actuating arms is attached to a respective knob of the pair of knobs, and the pair of knobs are configured to open and close based on movement of the actuating arms and the shield.

2. The pacifier of claim 1, further comprising at least one channel recess located on the front face or the back face and proximate to the shield opening, wherein the channel recess is configured to allow greater flexibility of the shield.

3. The pacifier of claim 1, wherein the knobs include a textured surface configured to improve grip when securing the pacifier to fabrics or other objects.

4. The pacifier of claim 1, wherein each of the knobs further comprises an outer gripping edge and an inner gripping edge that are configured to effectuate secure yet gentle grip of the pacifier to fabrics or other objects.

5. The pacifier of claim 1, wherein the shield is concave towards the nipple to assist in opening the knobs when force is applied by a user.

6. The pacifier of claim 1, further comprising a pair of pressing surfaces located on the back face of the shield, wherein applying force to the pressing surfaces causes the shield to flex along its median separating the actuating arms, and opening the knobs, and wherein releasing the pressing surfaces draws the knobs together to secure the pacifier to an object.

7. The pacifier of claim 1, further comprising at least one wall section proximate to the shield opening and configured to provide structural support to the actuating arms, contributing to the stable movement of the coupling mechanism.

8. A pacifier with an integrated coupling mechanism, comprising:

a shield having a front face, a back face, a shield opening, and ventilation holes, wherein the shield is configured to flex along its median;

a first overcoat layer forming an elastic region along portions of the shield configured to flex, wherein the first overcoat layer introduces a biasing tension when the shield is flexed, creating a compressive edge;

a nipple attached to and extending outwardly from the front face;

a pair of actuating arms attached to and extending outwardly from the back face, wherein the elastic region and the actuating arms collectively form the integrated coupling mechanism;

a pair of knobs, wherein each actuating arm of the pair of actuating arms is attached to a respective knob of the pair of knobs, the knobs configured to open and close in response to movement of the actuating arms and the shield, and the elastic region applying biasing tension to the actuating arms to draw the knobs into a closed position in the absence of external force;

wherein applying force to pressing surfaces on the shield causes the shield to flex at the elastic region, separating the actuating arms and opening the knobs; and wherein releasing the pressing surfaces allows the tension in the elastic region to contract, drawing the knobs together to secure the pacifier to an object placed between the knobs.

9. The pacifier of claim 8, further comprising at least one channel recess located on the front face or the back face proximate to the shield opening, wherein the channel recess is configured to allow greater flexibility of the shield.

10. The pacifier of claim 8, wherein the shield is divided into a first half shield and a second half shield with the elastic region therebetween, the first and second half shields are joined by the elastic region.

11. The pacifier of claim 10, further comprising a second overcoat layer that is applied over at least a portion of the first and second half shields in a manner that avoids coating a majority of the elastic region.

12. The pacifier of claim 11, wherein the knobs, the actuating arms, and the nipple are integrally formed as part of the second overcoat layer, the second overcoat layer providing structural support and enhancing the durability of the knobs, the actuating arms, and the nipple.

13. The pacifier of claim 8, wherein each of the knobs further comprises an outer gripping edge and an inner gripping edge that is configured to effectuate secure yet gentle grip of the pacifier to fabrics or other objects.

14. The pacifier of claim 8, further comprising at least one wall section proximate to the shield opening and configured to provide structural support to the actuating arms, contributing to the stable movement of the coupling mechanism.

15. A method of using the pacifier of claim 1, the method comprising the steps of:

applying pressure to pressing surfaces located on the back face of the shield to cause the shield to flex along its median, thereby separating the actuating arms and opening the knobs;

positioning the opened knobs around a portion of the object to be secured; and releasing the pressure on the pressing surfaces, allowing the shield to return to its resting state and the knobs to close under the biasing tension, thereby securing the pacifier to the object.

16. The method of claim 15, wherein applying pressure to the pressing surfaces flexes the shield at a set of channel recesses positioned on the front face or the back face proximate to the shield opening, facilitating the movement of the actuating arms and the opening of the knobs.

17. The method of claim 15, wherein the elastic region biases the knobs towards a closed position when no external force is applied to the pressing surfaces.

18. The method of claim 15, wherein the shield is concave toward the nipple side to aid in the separation of the knobs when the pressing surfaces are engaged by a user.

* * * * *